US012578208B2

(12) United States Patent
Infanger et al.

(10) Patent No.: US 12,578,208 B2
(45) Date of Patent: Mar. 17, 2026

(54) METHOD FOR APPLYING A MEASUREMENT SCALE TO A SURFACE OF A GUIDE CARRIAGE OF A LINEAR PROFILE RAIL GUIDE, MEASUREMENT SCALE FOR A LINEAR ENCODER, AND LINEAR ENCODER

(71) Applicant: Schneeberger Holding AG, Roggwil (CH)

(72) Inventors: Roger Infanger, Biglen (CH); Roger Lehmann, Kriegstetten (CH)

(73) Assignee: Schneeberger Holding AG, Roggwil (CH)

( * ) Notice: Subject to any disclaimer, the term of this patent is extended or adjusted under 35 U.S.C. 154(b) by 49 days.

(21) Appl. No.: 18/374,180

(22) Filed: Sep. 28, 2023

(65) Prior Publication Data

US 2024/0118114 A1 Apr. 11, 2024

(30) Foreign Application Priority Data

Oct. 5, 2022 (EP) ..................................... 22199910

(51) Int. Cl.
*G01D 5/347* (2006.01)

(52) U.S. Cl.
CPC ..... *G01D 5/34746* (2013.01); *G01D 5/34715* (2013.01)

(58) Field of Classification Search
CPC .......... G01D 5/34746; G01D 5/34715; G01D 5/2451; G01D 5/2454; G01D 5/34707;
(Continued)

(56) References Cited

U.S. PATENT DOCUMENTS

2007/0240325 A1* 10/2007 Pelsue ...................... B41M 5/24
219/121.85
2008/0149272 A1* 6/2008 Bouraya ............. G03F 7/70991
156/345.24
(Continued)

FOREIGN PATENT DOCUMENTS

DE 2 515 574 A1 10/1975
DE 10 2007 007 311 A1 8/2007
(Continued)

OTHER PUBLICATIONS

European Search Report dated Mar. 9, 2023 in European Application No. 22199909.7, with English translation of the relevant parts.
(Continued)

*Primary Examiner* — Thanh Luu
*Assistant Examiner* — Mai Thi Ngoc Tran
(74) *Attorney, Agent, or Firm* — Collard & Roe, P.C.

(57) ABSTRACT

A method for applying a measurement scale to a linear profile rail guide carriage surface, the guide carriage being configured to be guided on a guide rail linearly and longitudinally toward the guide rail and having a first side surface extending longitudinally, the measurement scale including at least one track extending linearly and longitudinally, including several mirror regions and marking regions arranged alternately one behind the other, uses a pulsed laser to generate a laser beam and introduces a microstructure in a first region corresponding to at least one first side surface marking region. A sequence of light pulses is directed at the first region so that the laser beam is moved two-dimensionally relative to the first region to irradiate successively different subregions of the first region by the light pulses. Each different irradiated subregion has an overlap in, or transverse to, the longitudinal direction with at least two other irradiated subregions.

12 Claims, 6 Drawing Sheets

15

(58) Field of Classification Search
     CPC .............. B23K 2103/04; B23K 26/032; B23K
                     26/0624; B23K 26/3568; G01B 11/02;
                                                    G01B 11/26
     See application file for complete search history.

(56)                    References Cited

U.S. PATENT DOCUMENTS

| | | | |
|---|---|---|---|
| 2011/0259631 A1 | 10/2011 | Rumsby | |
| 2016/0356971 A1* | 12/2016 | de Jong ................ | B29C 64/135 |
| 2022/0241899 A1* | 8/2022 | Kim ................... | B23K 26/0624 |
| 2024/0116136 A1* | 4/2024 | Infanger ........... | G01D 5/34746 |
| 2024/0375351 A1* | 11/2024 | Furuse ................... | B33Y 10/00 |

FOREIGN PATENT DOCUMENTS

| | | |
|---|---|---|
| EP | 3 060 887 B1 | 7/2017 |
| GB | 1 505 540 A | 3/1978 |

OTHER PUBLICATIONS

European Search Report dated Mar. 9, 2023 in European Application No. 22199910.5, with English translation of the relevant parts.

\* cited by examiner

Fig. 4A                                         Fig. 4B

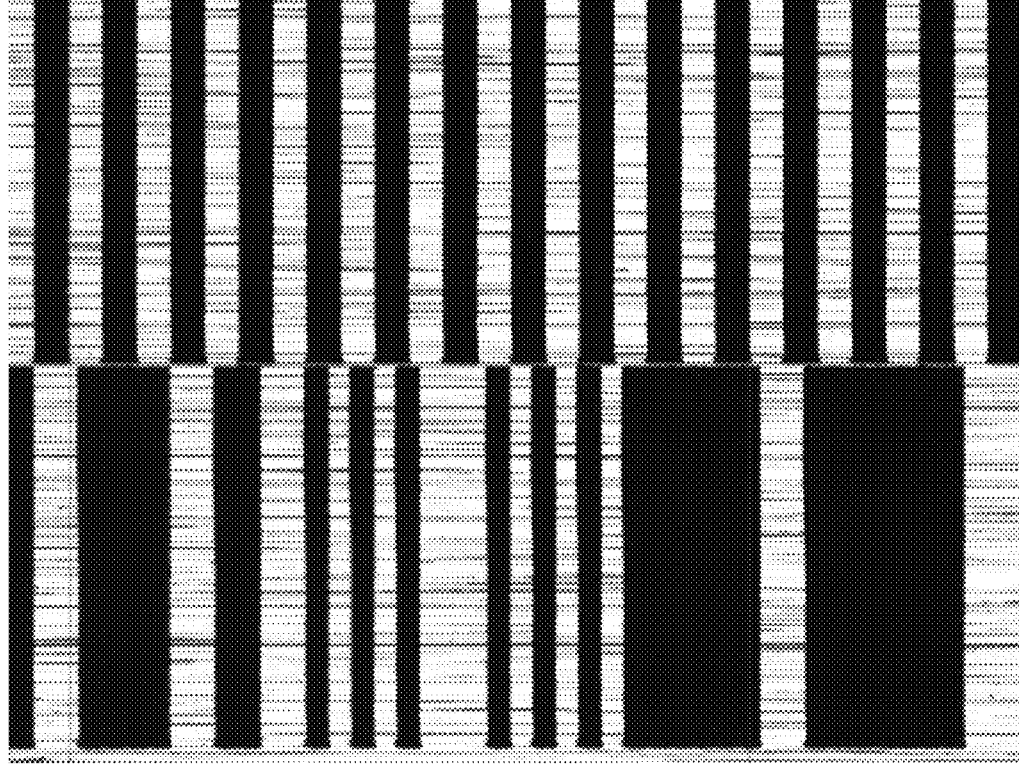
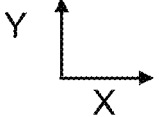
Fig. 5

Y
X

METHOD FOR APPLYING A MEASUREMENT SCALE TO A SURFACE OF A GUIDE CARRIAGE OF A LINEAR PROFILE RAIL GUIDE, MEASUREMENT SCALE FOR A LINEAR ENCODER, AND LINEAR ENCODER

CROSS REFERENCE TO RELATED APPLICATIONS

Applicant claims priority under 35 U.S.C. § 119 of European Application No. 22199910.7 filed Oct. 5, 2022, the disclosure of which is incorporated by reference.

BACKGROUND OF THE INVENTION

1. Field of the Invention

The present invention generally relates to a measurement scale for linear encoders as well as an optimized method for applying a measurement scale to a surface of a guide carriage of a linear profile rail guide.

2. Description of the Related Art

Measurement scales are known in principle from the prior art. They are used in particular in the case of incremental encoders. These are sensors for detecting changes in position (linear) or angle changes (rotating), which can detect a distance and direction or angular change, respectively, and direction of rotation. The known measurement scales of incremental encoders have periodically repeating scattering or absorption regions, which are counted by a sensor device in order to detect the change in position.

A measurement scale made of metal is thus known, for example, from the publication DE 2 515 574, which has scattering regions from a plurality of line elements. The line elements are parallel and narrow, wherein the width and depth thereof are dimensioned so that the line elements of a scattering region cannot be differentiated individually in visible light but can only be detected by their diffraction image.

In other words, each of the scattering regions known from the DE 2 515 574 consists of a plurality of line-like depressions (line elements), which are arranged directly next to one another, with a width of the magnitude of 1 μm (preferably 0.5 to 1.5 μm) and a depth, which is approximately 1.5 μm and which is thus in the magnitude of a wavelength of the light, by means of which the known measurement scale is illuminated using the reflected light method, for example under a photoelectric microscope.

As can be seen, for example, from the publication DE 10 2007 007 311, a light beam is directed onto a surface, which is provided with a reflective measurement scale, by means of a collimator using the reflected light method, so that the surface or the measurement scale, respectively, is illuminated with light, which is bundled essentially in parallel, wherein the light is incident at an angle (of incidence) to the surface normal. The measurement scale thereby comprises structured regions, which are structured with diffractive phase grating structures in the form of line gratings, and unstructured regions, which are in each case formed by a smooth (reflective) surface.

The angle of incidence of the light, which is incident on the surface, is thereby preferably selected so that light is diffracted on the diffractive phase grating structures in structured regions in such a way that a diffraction order of the diffracted light leaves the measurement scale perpendicularly. Under these circumstances, the light, which is incident on the unstructured regions, is in each case reflected on the surface, so that it leaves the unstructured regions (hereinafter also referred to as "mirror regions") at an angle of reflection to the surface normal, which is identical to the angle of incidence. The light diffracted essentially perpendicular to the surface at the structured regions is then imaged onto the photo sensors of a sensor device, wherein the sensor device is preferably arranged so that the light reflected on the unstructured regions (mirror regions) is not detected by the photo sensors of the sensor device.

The structured regions can therefore be detected by means of the sensor device as bright fields and the unstructured regions (mirror regions) as dark fields.

If the sensor device is displaced along the incremental track, the sensor device thus detects in particular the light refracted on the structured regions (dark field measurement of the structured regions). The structured regions and the unstructured regions (mirror regions) are in each case arranged in a row one behind the other so as to alternate with one another and jointly form an incremental track. The structured regions are thereby arranged at constant distances and are separated from one another by means of the mirror regions. A so-called marking is therefore in each case formed by means of each of the structured regions, wherein the respective markings of the incremental track can be counted by the sensor device and can be converted into a periodically changing sensor signal, if the sensor device is moved relative to the markings in the longitudinal direction of the incremental track.

The periodic sensor signal can be used by a processing unit to calculate the displacement along the measurement scale. Due to the fact that the sensor signal changes periodically in response to a movement of the sensor device in the longitudinal direction of the incremental track, it is possible to measure the respective sensor signal at different positions of the sensor device in response to a movement of the sensor device in the longitudinal direction of the incremental track and to thus assign different measured values for the sensor signal to different positions of the sensor device. An interpolation between different measured values for the sensor signals, which are in each case assigned to different predetermined positions of the sensor device with respect to the incremental track, finally provides for a determination of any position of the sensor device (between respective two of the predetermined positions of the sensor device) with a high accuracy.

To increase the sensor signal, it is possible to illuminate the measurement scale simultaneously with light from two different light sources, which are arranged next to one another, so that light impinges on the surface or the measurement scale, respectively, from two different directions (in each case at an angle to the surface normal).

The measurement scales known from the prior art have the disadvantage that the sensor signal detected by the sensor device often only has a very low contrast, i.e. the sensor device in each case generates sensor signals by scanning the scattering or absorption regions and the mirror regions in such a way that a sensor signal generated by scanning a scattering or absorption region and a sensor signal generated by scanning a mirror region differ relatively little and therefore have a relatively small difference (contrast).

In turn, this can result in that individual scattering or absorption regions are not sufficiently detected and the displacement of the sensor device is detected insufficiently with respect to the measurement scale. In the case of the measurement scales known from the prior art, it is further considered to be problematic that the sensor signals, which can be obtained by means of a reflection on the measurement scale, have an interpolation ability, which is too low.

There is in particular a need to the effect of specifying a distance measuring system, which works according to the principle of the bright field measurement, wherein a change in position can be detected in a reliable manner by means of a detector arranged "in the bright field". Bright field measurement means that the detector is reached directly by the radiation reflected on the mirror regions when no scattering or absorption region of a measurement scale is present in the measuring region of the distance measuring system.

This means in particular that the light source illuminates the scale, which is applied to the measurement scale, parallel to the beam path of the sensor, which differs from a dark field illumination, in the case of which the scale is illuminated approximately at an angle of 45°. The mode of operation of the used encoder of the distance measuring system, which works according to the principle of the bright field measurement, thereby requires a constant (mirror-like) reflection of the light emitted by the light source on mirror regions of the measurement scale. If possible, each beam, which is incident on the surface of the measurement scale, is to be reflected at the same angle to the surface normal in the respective mirror regions of the measurement scale.

Linear profile rail guides generally comprise a (linear) guide rail and at least one movable guide carriage, which is guided on the guide rail in such a way that it can be moved linearly in the longitudinal direction of the guide rail. In the case of profile rail guides of this type, there is generally an interest in detecting the position of the guide carriage, which is guided on the guide rail and which can be moved linearly in the longitudinal direction of the guide rail by means of measurement.

A linear encoder, which comprises a measurement scale extending in the longitudinal direction of the guide rail and a sensor device, which can be moved relative to the measurement scale in the longitudinal direction of the measurement scale, for scanning the respective markings of the measurement scale, can serve the purpose of detecting the position of the guide carriage by means of measurement in this case. In order to provide for a detection of the position of the guide carriage of the linear profile rail guide by means of measurement, the sensor device can be arranged on the guide carriage in such a way that it can be moved in the longitudinal direction of the guide rail, together with the guide carriage.

In order to provide for a simplified installation of a linear profile rail guide in combination with a linear encoder for detecting the position of a guide carriage, which can be moved in the longitudinal direction of the guide rail of the linear profile rail guide, by means of measurement, it has been proposed, for example, to provide the guide rail of the linear profile rail guide, together with the measurement scale, in the form of a single workpiece, and, for this purpose, to form the respective markings of the measurement scale directly on a surface of the guide rail by means of a treatment of the surface of the guide rail, for example by means of a treatment of the surface by means of a laser beam.

A measurement scale for an incremental encoder and a method for producing a measurement scale on a metal surface by means of a pulsed laser is known from the publication EP 3060887 B1, wherein this method is generally suitable to realize a corresponding measurement scale on a surface of a guide rail of a linear profile rail guide. The method disclosed in the publication EP 3060887 B1 is designed for an incremental encoder comprising a measurement scale, which has an incremental track comprising scattering regions and mirror regions, which are arranged so as to alternate in a longitudinal direction, wherein the incremental encoder comprises a sensor device, which is formed to optically scan the incremental track, and which, for this purpose, has a measuring head, which can be moved relative to the measurement scale, comprising an optical imaging means for generating an image of the incremental track as well as a plurality of photo sensors for detecting the image. In order to provide for an optical scanning of the incremental track, an illumination of the incremental track comprising two light sources is provided, which generate light, which impinges on the scattering regions and mirror regions of the measurement scale at an angle, which is selected so that light reflected directly on the mirror regions of the measurement scale does not impinge on the optical imaging means and can thus not be detected by the photo sensors. Instead, the sensor device is designed to detect only light, which is scattered at the scattering regions of the measurement scale essentially perpendicular to the metal surface, at which the measurement scale is formed (which corresponds to an optical detection of the scattering regions of the measurement scale according to the principle of a dark field measurement). In order to attain that the scattering regions of the measurement scale can be detected by the sensor device with a largest possible contrast compared to the mirror regions, it is proposed in the publication EP 3060887 B1 to produce the scattering regions of the measurement scale on the metal surface by means of a treatment of the surface by means of a pulsed laser in such a way that each of the scattering regions has at least two line-like depressions, which extend essentially perpendicular to the longitudinal direction of the incremental track and are arranged in the longitudinal direction of the incremental track one behind the other in a row and are formed to diffusely reflect incident light, wherein each individual one of the line-like depressions of the scattering regions are in each case formed from a plurality of essentially round depressions, which are arranged so as to overlap one another. With regard to the dimensions of the line-like depressions of a scattering region of the arrangement of the line-like depressions of a scattering region relative to one another, it is proposed in the publication EP 3060887 B1 that the width of the line-like depressions in the longitudinal direction of the incremental track and/or the respective distances between two adjacent line-like depressions can be suitably selected in order to attain that the spatial intensity distribution of the light diffusively reflected by the line-like depressions of an individual scattering region can be relatively homogenous and that the scattering regions of the measurement scale can be detected by the sensor device in response to an optical detection of the scattering regions of the measurement scale realized in this case according to the principle of a dark field measurement with a relatively large contrast compared to the mirror regions, when each of the line-like depressions—in the longitudinal direction of the incremental track—has a width of 3.5 µm to 12 µm, preferably 6 µm to 9 µm, and in particular approximately 7 µm, and the distance between two adjacent parallel, line-like depressions is greater than zero. In this respect, it is in particular proposed in the publication EP 3060887 B1 that the scattering regions in each case have at least three parallel, line-like depressions, which are aligned perpendicular with respect to the longitudinal direction of the incremental track and which are spaced apart from one another at a distance of 6 to 9 μm, preferably approximately 7.5 μm.

A measurement scale known from the publication EP 3060887 B1 turns out to be problematic in the case of an optical scanning of the measurement scale according to the principle of the bright field measurement. In this case, the light irradiated onto the measurement scale is reflected in such a way on the mirror regions and is scattered on the individual scattering regions (which are in each case formed from several line-like depressions, which are spaced apart from one another) in such a way that the scattering regions of the measurement scale can be detected by the sensor device in response to an optical detection of the scattering regions of the measurement scale according to the principle of a bright field measurement, at best with a low contrast compared to the mirror regions, which makes an evaluation of the measuring signals generated by the sensor device more difficult and which significantly impacts the accuracy of a determination of the distance covered by the sensor device in the longitudinal direction of the measurement scale in response to a movement of the sensor device in the longitudinal direction of the measurement scale.

The profile rail guides known from the prior art comprising a measurement scale known from the publication EP 3060887 B1 are thus not well suited for an optical scanning of the measurement scale according to the principle of the bright field measurement.

A realization of the above-described embodiment of a profile rail guide, in the case of which a detection of the position of the guide carriage by means of measurement with respect to the longitudinal direction of the guide rail is attained in that the guide rail is provided with a measurement scale, which extends in the longitudinal direction of the guide rail, and a sensor device, which is suitable for scanning the measurement scale, is moreover fastened to the guide carriage, can be associated with disadvantages with regard to a number of applications. For example, a fastening of a sensor device to the guide carriage of a profile rail guide requires that sufficient space is available for the sensor device, in order to fasten the sensor device to the guide carriage in a suitable way in such a way that the sensor device is suitable to scan the measurement scale. This requirement is limiting for the construction of the profile rail guide, for example with regard to the geometric dimensions of the guide carriage. Constructions of profile rail guides are known, for example, in the case of which a sensor device intended for scanning a measurement scale is arranged on a front surface of a guide carriage. The guide carriage and the sensor device form a physical unit in this case, which—compared to the guide carriage—can have a relatively large space requirement. The scanning of a measurement scale applied to a guide rail by means of a sensor device arranged on the front surface of the guide carriage can be problematic in this case, for example when the extension of the guide rail in the longitudinal direction of the guide rail (for space reasons) has to be relatively short (for example not significantly longer than the extension of the guide carriage in the longitudinal direction of the guide rail). In this case, the guide carriage and the sensor device moreover form a physical unit, which—compared to the guide carriage—can have a relatively large mass. The latter, in turn, is disadvantageous in particular in dynamic applications, in which the guide carriage has to often be moved with a relatively large acceleration in the longitudinal direction of the guide rail.

SUMMARY OF THE INVENTION

On the basis of this problem, the invention is thus based on the object of specifying an optimized method for applying a measurement scale to a surface region of a linear profile rail guide, wherein the measurement scale is suitable for a use as part of a linear encoder, which is based on an optical scanning of the measurement scale according to the principle of the bright field measurement and which is embodied to provide for the detection of a change in position of a guide carriage of the profile rail guide with respect to a guide rail of the profile rail guide in a reliable manner.

A corresponding measurement scale and a corresponding linear encoder is to furthermore be specified.

With regard to the method, the object on which the invention is based is solved by means of the subject matter of one aspect of the invention. With regard to the measurement scale, the object on which the invention is based is solved by means of another aspect of the invention and with regard to the linear encoder by means of a further aspect of the invention.

The method serves the purpose of applying a measurement scale to a surface of a guide carriage of a linear profile rail guide, wherein the guide carriage is configured to be guided on a guide rail of the profile rail guide, so that the guide carriage can is configured to be linearly movable in the longitudinal direction of the guide rail, and wherein the guide carriage has a first side surface, which extends in the longitudinal direction of the guide rail, wherein the measurement scale comprises at least one track, which extends linearly in the longitudinal direction of the guide rail and comprises several mirror regions and marking regions arranged one behind another in an alternating manner, wherein each of the marking regions extends in a line-like manner transverse to the longitudinal direction of the at least one track, and wherein the method has the following method steps:

providing a pulsed laser for generating a laser beam; and providing at least one of the marking regions by introducing a microstructure in a first region, which corresponds to the at least one marking region, of the first side surface of the guide carriage, in that:

the laser generates the laser beam with a sequence of several light pulses, and the laser beam is directed at the first region of the first side surface in such a way that only a subregion of the first region is irradiated by means of each individual light pulse of the generated sequence of several light pulses in such a way that the first side surface in the subregion of the first region, which is irradiated by means of the respective individual light pulse, is changed due to the irradiation by means of the respective individual light pulse in such a way that after the irradiation by means of the respective individual light pulse, the first side surface has a spatial modulation of the first side surface, which extends over the subregion of the first region, which is irradiated by means of the respective individual light pulse, wherein the spatial extension of the subregion of the first region, which is irradiated by means of the respective individual light pulse, in the longitudinal direction of the at least one track is smaller than the spatial extension of the first region in the longitudinal direction of the at least one track, and that the spatial extension of the subregion irradiated by means of the respective individual light pulse transverse to the longitudinal direction of the at least one track is smaller than the spatial extension of the first region transverse to the longitudinal direction of the at least one track;

the laser beam is moved relative to the guide carriage, so that at least several of the light pulses of the generated sequence of several light pulses irradiate several different subregions of the first region, which are arranged spatially distributed to one another, sequentially in time.

For each individual one of the several different irradiated subregions, at least one other one of the several different irradiated subregions is thereby present, which is offset to the respective individual ones of the several different irradiated subregions in the longitudinal direction of the at least one track and/or transverse to the longitudinal direction of the at least one track in such a way that the respective individual one of the several different irradiated subregions and the at least one other one of the several different irradiated subregions have an overlap, wherein the several different irradiated subregions together form a region of the first side surface, which is congruent with the first region.

For each individual one of the several different irradiated subregions, at least two other ones of the several different irradiated subregions are in particular present, which are spatially offset to the respective individual one of the several different irradiated subregions in such a way that one of the at least two other ones of the several different irradiated subregions is offset relative to the respective individual one of the several different irradiated subregions in the longitudinal direction of the at least one track, and the one of the at least two other ones of the several different irradiated subregions and the respective individual one of the several different irradiated subregions have an overlap (in the longitudinal direction of the at least one track), and that the other one of the at least two other ones of the several different irradiated subregions is offset relative to the respective individual one of the several different irradiated subregions transverse to the longitudinal direction of the at least one track, and the other one of the at least two other ones of the several different irradiated subregions and the respective individual one of the several different irradiated subregions have an overlap (transverse to the longitudinal direction of the at least one track).

In the case of the method according to the invention, the laser beam is moved two-dimensionally over a first region of the first side surface of the guide carriage, which corresponds to a marking region of the measurement scale to be applied, so that different subregions of the first region of the first side surface are irradiated one after the other. The irradiation of a subregion by means of one of the light pulses locally effects a slight removal and/or a spatial redistribution of the material forming the first side surface of the guide carriage, so that the shape of the surface in the irradiated subregion is changed after the irradiation by means of a light pulse.

In this context, the term "subregion of the first region irradiated by means of the respective individual light pulse" is to identify that subregion of the first side surface, in which the shape of the surface in the irradiated subregion has a change in the form of a spatial modulation due to the irradiation by means of the respective individual light pulse (compared to the surface prior to the irradiation by means of the respective individual light pulse). It is important to point out that the spatial extension of a subregion of the first side surface, in which the shape of the surface in the irradiated subregion is changed due to the irradiation by means of the respective individual light pulse, can be a function of the intensity of the respective light pulse.

Due to the fact that the laser beam is moved over the first region of the first side surface of the guide carriage in such a way that each of the different irradiated subregions has to have an overlap with at least one other one of the irradiated subregions, it is attained that the first side surface of the guide carriage in the first region has a spatial modulation after the irradiation by means of the light pulses, so that the first side surface in the first region—compared to its state prior to the irradiation by means of the light pulses—has an increased roughness. The irradiation of the first region by means of the light pulses provides for a microstructuring of the first side surface in such a way that a surface, which is smooth prior to the irradiation, has an arrangement of elevations ("microstructure") in the entire first region after the irradiation, which represents an essentially even roughening of the surface.

This roughening of the surface changes the reflectivity of the surface in the irradiated first region in such a way that light, which is incident perpendicular to the surface, in the irradiated first region of the surface is essentially not reflected back perpendicular to the surface but is scattered repeatedly and is absorbed between the individual elevations generated in the irradiated first region.

The subregions of the first region, which are irradiated by means of a respective individual light pulse, are spatially distributed in such a way that each subregion, which is irradiated by means of an individual light pulse, has overlaps with at least two other subregions, which are irradiated by means of a respective individual light pulse. The respective subregions are spatially offset relative to one another in such a way that each of the subregions, which is irradiated by means of a light pulse, in each case has an overlap with another subregion, which is offset in the longitudinal direction of the at least one track, and additionally has an overlap with another subregion, which is in each case offset transverse to the longitudinal direction of the at least one track. The subregions of the first region, which are in each case irradiated by means of an individual light pulse, accordingly have overlaps in two dimensions (i.e. in the longitudinal direction of the at least one track as well as transverse to the longitudinal direction of the at least one track). Due to the overlaps in two dimensions, it is attained that the reflectivity of the surface is reduced particularly strongly in the irradiated first region.

The measurement scale produced by means of the method according to the invention thus has the advantage that the individual marking regions of the measurement scale essentially absorb light, which is incident perpendicular to the surface. Under these circumstances, a sensor device of a linear encoder provided for optically scanning purposes is able to essentially exclusively detect light, which has been reflected to the mirror regions.

The marking regions of the measurement scale could thus advantageously be detected by the sensor device during an optical detection of the marking regions according to the principle of a bright field measurement with a relatively large contrast compared to the mirror regions.

According to the invention, in particular microstructures are thus introduced in the respective marking regions of the measurement scale into the first side surface of the guide carriage with the help of the pulsed laser in such a way that this leads to a dark, high-contrast formation of the surface without removal of material. On the surface of the guide carriage, extremely short light pulses lead to structures with a plurality of elevations in the nanometer range. The microstructured surface ensures that the scattering of the light is reduced and a permanently deep and view-stable blackening of the surface is created in the respective marking regions of the measurement scale.

According to the invention, the highly reflective metal surface of the guide carriage is, in other words, partially roughened by means of high-energy radiation (laser radiation), in order to provide absorption regions within the metal surface. In detail, the metal surface is thereby melted by means of short laser pulses with high-energy laser radiation. The roughening regions are melted in particular by means of short laser pulses lasting <15 nanoseconds, whereafter the immediate resolidification of the surface takes place during the pulse pauses.

If the light pulses used for introducing the microstructures in the marking regions are ultra short (i.e. with a pulse duration of 20 picoseconds or less than 20 picoseconds), the color change in certain parameter regions additionally remains corrosion-resistant. The reason for this is that the heat influence zone is extremely small due to the use of ultra short-pulse lasers, so that a self-healing oxide layer can form in the roughening region.

The advantage of the method according to the invention for applying a measurement scale to a surface of the guide carriage is to in particular be seen in that the introduced microstructure has the so-called viewing angle stability. The very high, even contrast from all viewing angles can be attributed to the nanostructures, which are created when introducing the microstructure into the first side surface of the guide carriage, and which reflect and absorb the light in a repeatedly scattered manner.

Due to the introduction of the microstructure into the first side surface of the guide carriage by means of the pulsed laser, a significant color change is additionally caused on the metal—all the way to a deep dark shade of black in the marking regions.

The use of ultra short-pulse lasers additionally has the result that very small and delicate roughening regions can be introduced into the first side surface. When using ultra short-pulse lasers, the pulse durations are about 10,000-times shorter and thereby more energy rich than in the case of other marking lasers, and the roughening regions can be applied with a very small spot size. The method according to the invention is thus in particular suitable to realize filigree roughening regions in the first side surface of the guide carriage and in particular filigree absorption regions of the first side surface of the guide carriage.

Due to the short exposure time when using an ultra short-pulse laser, the chemical integrity of the surface is maintained, so that a corrosion-resistant introduction of the roughening regions and thus a corrosion-resistant formation of the marking regions of the measurement scale is made possible.

According to preferred realizations of the method according to the invention, it is thus provided in particular that the laser is formed as short-pulse laser for generating pulsed laser light by means of light pulses with pulse durations of less than 15 nanoseconds or as ultra short-pulse laser for generating pulsed laser light by means of light pulses with pulse durations of less than 20 picoseconds. The pulse parameters of the laser and/or a laser focus are/is selected in such a way that a material roughening in the nanometer range is formed when introducing the microstructure into the first side surface of the guide carriage without material removal or at least without significant material removal along the surface paths.

The use of an ultra short-pulse laser makes it possible that the side surface of the guide carriage can quasi be treated without thermal and mechanical influence. The light pulse—and thus the duration of the energy input—is so short that the temperature transport to the adjoining atoms does not even come to pass at all and thermal stress cracks, which could be created in the case of non-adapted parameter selection, are thus also avoided. For this reason, the introduction of the microstructure into the first side surface of the guide carriage by means of an ultra short-pulse laser can also be considered to be a "cold treatment", during which the material is structured in the nanometer range by means of the laser.

The laser beam can have, for example, an essentially round beam bundle with a diameter, which is selected in such a way that it has a diameter of 3.5 µm to 12 µm, preferably 6 µm to 9 µm, and in particular approximately 8 µm, on the first side surface of the guide carriage.

To introduce the microstructure in the first region of the first side surface of the guide carriage, which corresponds to a marking region, the laser beam can be directed at the first region of the first side surface in such a way that the overlap between the respective individual one of the several different irradiated subregions and the at least one other one of the several different irradiated subregions in the longitudinal direction of the at least one track has a spatial extension, which is 20-50% of the spatial extension of the subregion of the first region, which is irradiated by means of the respective individual light pulse, in the longitudinal direction of the at least one track. The laser beam can accordingly be directed at the first region of the first side surface in such a way that the overlap between the respective individual one of the several different irradiated subregions and the at least one other one of the several different irradiated subregions transverse to the longitudinal direction of the at least one track has a spatial extension, which is 20-50% of the spatial extension of the subregion of the first region, which is irradiated by means of the respective individual light pulse, transverse to the longitudinal direction of the at least one track. Due to the above-mentioned overlap between the different irradiated subregions, it is ensured that the microstructure, which is introduced in the first region of the first side surface, comprises a plurality of smaller elevations, which are spatially distributed essentially evenly over the entire area of the first region and which represents a particularly finely structured and homogenous roughening of the surface over the entire area of the first region. It is attained in this way that light, which is incident on the respective marking region, can be absorbed essentially evenly on the entire area of the first region.

In order to further optimize the contrast, which can be attained by means of the measurement scale, it is provided that prior to the introduction of the microstructure into the first side surface of the guide carriage by means of the pulsed laser beam, at least the first side surface is subjected to a surface treatment in such a way that little material is in particular removed from the first side surface.

Alternatively or additionally, it is provided for this purpose that after the introduction of the microstructure into the first side surface of the guide carriage by means of the laser beam, at least the first side surface of the workpiece is subjected to a surface cleaning.

Highly reflective mirror regions of the measurement scale can be realized with these measures.

In particular, at least the first side surface should in this context be subjected to the surface treatment by means of polishing prior to the introduction of the microstructures into the first side surface of the guide carriage by means of the pulsed laser beam. It is preferred in this context that the first side surface, after the treatment thereof, has an average roughness value (Ra) of max. 0.3 µm, preferably an average roughness value (Ra) of max. 0.1 µm, and even more preferably an average roughness value (Ra) in a range of approximately 0.007 µm to 0.1 µm. It is conceivable in particular in this context that at least the first side surface is subjected to the surface treatment by means of polishing disks, by means of laser polishing and/or by means of electropolishing. It is attained in this way that the first side surface has a particularly high reflectivity for light after the polishing. It is attained accordingly that after the application of the measurement scale by means of the pulsed laser beam to the polished first side surface, the mirror regions of the measurement scale have a particularly high reflectivity for light.

After a polishing of the first side surface of the guide carriage, the microstructure can be introduced into the first side surface by means of the light pulses in such a way that after the introduction of the microstructure in one of the marking regions of the measurement scale, the first side surface has, in one of the mirror regions of the measurement scale, an average roughness value (Ra), which is greater by more than a factor of 10 than the average roughness value of the side surface. It is attained in this way that the marking regions of the measurement scale can be detected by a sensor device for optically detecting the marking regions according to the principle of a bright field measurement with a particularly large contrast compared to the mirror regions.

As already described, the first side surface should preferably be subjected to a surface cleaning after the introduction of the respective microstructures into the first side surface by means of the pulsed laser beam. This is in particular a laser treatment and/or a vibration cleaning or a cleaning by means of ultrasound. A surface cleaning of this type is expedient in particular when the microstructures are applied in the respective marking regions with the help of a short-pulse laser, which generates pulsed laser light by means of light pulses with pulse durations in the range of nanoseconds. During a treatment of the first side surface by means of light pulses with pulse durations in the range of nanoseconds, the impinging of one of the light pulses on the first side surface has the effect that due to the local thermal stress of the side surface in the region irradiated by means of the impinging light pulse, the structure of the surface in the region irradiated by means of the impinging light pulse is changed in such a way that a plurality of small particles, which are not firmly bonded to the first side surface but only adhere loosely to the first side surface, are formed from atoms of the material forming the first side surface in the region irradiated by means of the impinging light pulse. The formation of these particles, which adhere only loosely to the first side surface, locally impacts the mechanical and chemical stability of the first side surface in the region irradiated by means of the impinging light pulse. Due to the fact that after the introduction of the respective microstructures into the first side surface by means of the pulsed laser beam, the first side surface is subjected to a surface cleaning, it can be attained that the particles, which were generated in the regions irradiated by means of the light pulses and which adhere loosely to the first side surface, are removed completely. The mechanical and chemical stability of the first side surface can be improved in this way in the regions, which are irradiated by means of impinging light pulses.

The measurement scale can be formed in such a way that the at least one track, which extends linearly in the longitudinal direction of the guide rail, is formed as incremental track with a plurality of equidistantly arranged marking regions.

Alternatively, the measurement scale can be formed in such a way that the at least one track, which extends linearly in the longitudinal direction of the guide rail, is formed as reference track with at least one marking region for encoding at least one reference position or as reference track with several marking regions arranged one behind the other in the longitudinal direction of the guide rail for encoding several different reference positions.

According to a further embodiment, the measurement scale according to the invention has a first track, which extends linearly in the longitudinal direction of the guide rail and which is formed as incremental track with a plurality of equidistantly arranged marking regions, and further has a reference track, which is arranged parallel next to the first incremental track and which has one or several marking regions for encoding one or several reference positions. The reference track is thereby in particular formed to specify an absolute position of a measuring head along the measurement scale. In order to determine the respective absolute position of the measuring head at any location, a change, for example, of the relative position (measured over the first incremental track) of the measuring head can be measured with respect to a certain reference marking of the reference track. It is thus possible by means of the reference track that the linear encoder does not only detect a change in position of the measuring head, but also the absolute position of the measuring head with respect to the longitudinal direction of the measurement scale.

As already mentioned, the measurement scale according to the invention is formed in particular to be used in combination with a linear encoder, which provides for an optical scanning of the measurement scale. A linear encoder of this type has at least one measurement scale according to the invention as well as a sensor device, which is formed to optically scan the at least one track of the measurement scale.

The at least one sensor device of the linear encoder can thereby have a measuring head, which is arranged in a stationary manner with respect to the guide rail, comprising an optical imaging means for generating an image of the at least one track as well as a plurality of photo sensors for detecting the image, wherein the sensor device can in particular be formed in such a way that the photo sensors generate an output signal when detecting the image. In the case of a change of the position of the guide carriage with respect to the longitudinal direction of the guide rail, the output signal generated by the photo sensors varies according to the respective arrangement of the different marking regions of the measurement scale in the longitudinal direction of the guide rail.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the Drawings,

FIG. 5 shows a top view through a microscope onto a measurement scale applied to a surface of a guide carriage of a profile rail guide by means of the method according to the invention;

DETAILED DESCRIPTION OF PREFERRED EMBODIMENTS

Figures 1A, 1B, 1C:
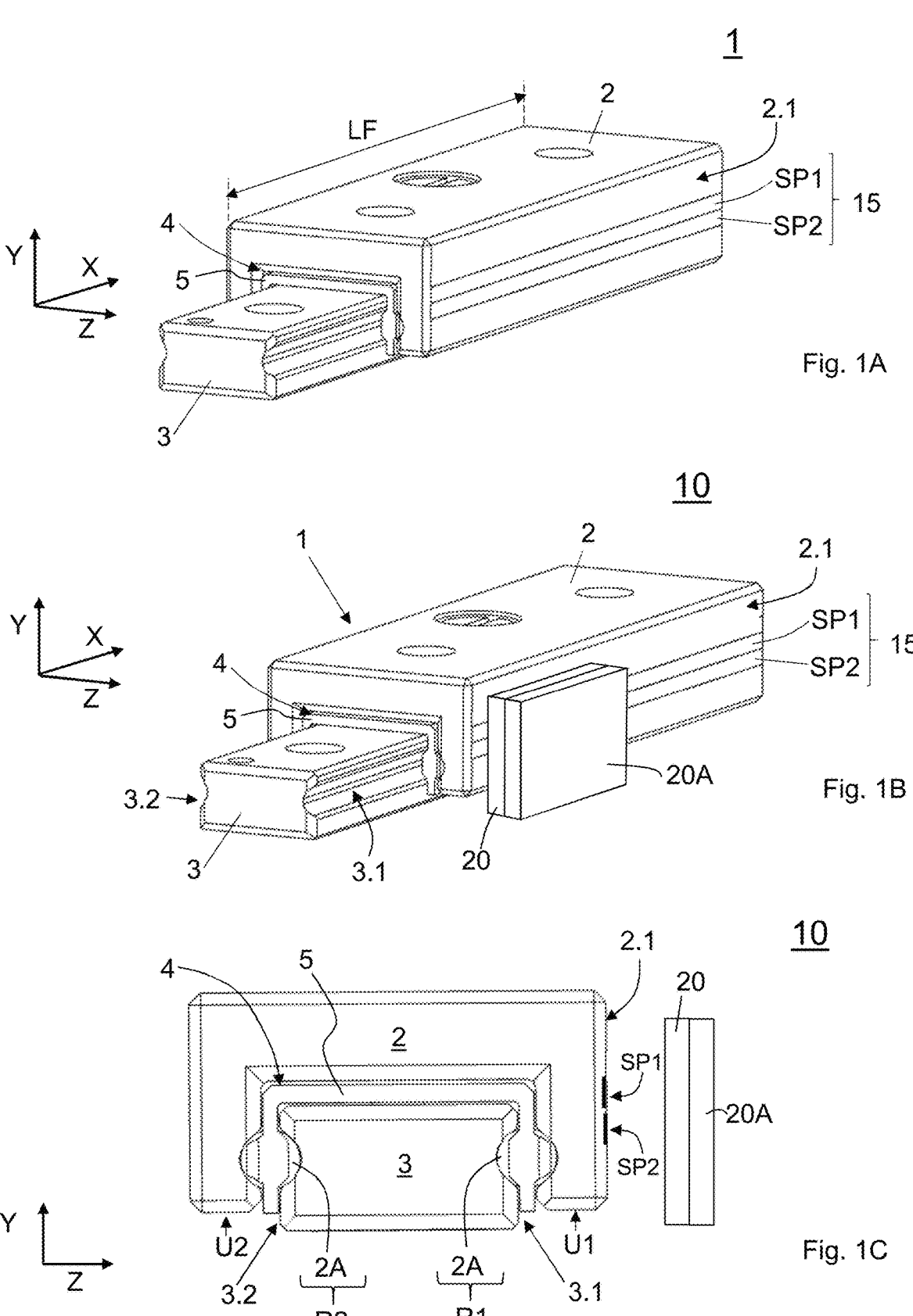
FIG. 1A schematically shows a profile rail guide comprising a guide rail and a guide carriage, comprising a measurement scale applied to a side surface of the guide carriage, in a perspective view.
FIG. 1B shows the profile rail guide according to FIG. 1A in combination with a distance measuring system for measuring a distance covered by the guide carriage in the longitudinal direction of the guide rail, in a perspective view.
FIG. 1C shows the profile rail guide according to FIG. 1A in combination with the distance measuring system according to FIG. 1B, in a front view in the longitudinal direction of the guide rail.

Unless mentioned otherwise, the same reference numerals are in each case used for the same elements in the figures.

FIGS. 1A, 1B and 1C show a profile rail guide 1, comprising a guide rail 3 and a guide carriage 2, which can be moved in the longitudinal direction of the guide rail 3, in combination with a distance measuring system 10 for measuring a distance covered by the guide carriage 2 in the longitudinal direction of the guide rail 3. It is assumed in the illustrations according to FIGS. 1A, 1B and 1C that the X axis of a cartesian coordinate system illustrated in FIG. 1A, 1B or 1C, respectively, with three orthogonal axes X, Y or Z, respectively (X axis, Y axis or Z axis, respectively) extends in the longitudinal direction of the guide rail 3 and that the guide carriage 2 can thus be linearly moved in the direction of the X axis.

As suggested in FIGS. 1A-10, the guide carriage 2 is formed in such a way that the guide carriage—in a cross section perpendicular to the longitudinal direction of the guide rail 3—has a U-shaped profile comprising two legs—a first leg U1 and a second leg U2— wherein this U-shaped profile extends around the guide rail 3 in such a way that the two legs U1 or U2, respectively, are arranged on opposite side surfaces 3.1 or 3.2, respectively, of the guide rail 3: The first leg U1 of the U-shaped profile of the guide carriage 2 extends essentially parallel to the side surface 3.1 in the longitudinal direction of the guide rail 3 on the side surface 3.1 of the guide rail 3, and the second leg U2 of the U-shaped profile of the guide carriage 2 extends essentially parallel to the side surface 3.2 in the longitudinal direction of the guide rail 3 on the side surface 3.2 of the guide rail 3.

The guide carriage 2 of the profile rail guide 1 is supported by means of a plurality of rolling bodies 2A (in the present example in the shape of balls), which are arranged in an intermediate space 4 formed between the guide rail 3 and the guide carriage 2, so that each of the rolling bodies 2A is in contact with the guide rail 3 as well as with the guide carriage 2, and the rolling bodies 2A roll on a region of the surface of the guide rail 3 as well as on a region of the surface of the guide carriage 2 in response to a movement of the guide carriage 2 in the longitudinal direction of the guide rail 3.

As suggested in FIG. 10, the rolling bodies 2A are arranged in the intermediate space 4 in such a way that a first subset of the entirety of all rolling bodies 2A are in each case arranged one behind the other in a first row R1, which extends linearly in the longitudinal direction of the guide rail 3, and a second subset of the entirety of all rolling bodies 2A are in each case arranged one behind the other in a second row R2, which extends linearly in the longitudinal direction of the guide rail 3.

As suggested in FIG. 10, the first row R1 of the rolling bodies 2A and the second row R2 of the rolling bodies 2A in each case extend parallel to one another and in each case at a distance from one another in the longitudinal direction of the guide rail 3 in such a way that the first row R1 of the rolling bodies 2A is arranged in the intermediate space 4 between the first leg U1 of the U-shaped profile of the guide carriage 2 and the first side surface 3.1 of the guide rail 3, and the second row R2 of the rolling bodies 2A is arranged in the intermediate space 4 between the second leg U2 of the U-shaped profile of the guide carriage 2 and the second side surface 3.2 of the guide rail 3.

As can be seen from FIGS. 1A-1C, all rolling bodies 2A of the first row R1 and all rolling bodies 2A of the second row R2 are held relative to one another in respective predetermined positions in the intermediate space 4: For this purpose, a cage 5 is arranged in the intermediate space 4 between the guide carriage 2 and the guide rail 3, which cage extends in the longitudinal direction of the guide rail 3 and has a U-shaped profile in a cross section perpendicular to the longitudinal direction of the guide rail 3. In order to hold the rolling bodies 2A of the first row R1 and the rolling bodies 2A of the second row R2 relative to one another in respective predetermined positions in the intermediate space 4, the cage 5 has a plurality of holes (not illustrated in the figures), which in each case extend transverse to the longitudinal direction of the guide rail 3 and which are moreover formed in such a way that each of the holes serves the purpose of receiving one of the rolling bodies 2A and each of the rolling bodies 2A is arranged in one of the holes in such a way that the respective rolling body is in contact with the guide rail 3 as well as with the guide carriage 2. In response to a movement of the guide carriage 2 in the longitudinal direction of the guide rail 3, the cage 5 thus has the effect that all rolling bodies 2A of the first row R1 and all rolling bodies 2A of the second row R2 can only roll synchronously with one another on the surface of the guide rail 3 and the surface of the guide carriage 2, in each case in the longitudinal direction of the guide rail 3, due to the arrangement of the individual rolling bodies 2A in one of the holes of the cage 5, and all rolling bodies 2A of the first row R1 and all rolling bodies 2A of the second row R2 can in each case only move together with the cage 5 relative to the guide rail 3 and relative to the guide carriage 2, in each case in the longitudinal direction of the guide rail 3.

The cage 5 is formed in such a way that the cage extends in the intermediate space 4 in the longitudinal direction of the guide rail 3 by a distance (hereinafter "longitudinal extension of the cage 5"), which is shorter than the longitudinal extension LF of the guide carriage 2 in the longitudinal direction of the guide rail 3. Under these circumstances, the guide carriage 2—in each case supported on the guide rail 3 by means of all roller bodies 2A of the first row R1 and all roller bodies 2A of the second row R2—can be moved in the longitudinal direction of the guide rail 3 only over a finite distance (hereinafter "maximum movement distance of the guide carriage 2 in the longitudinal direction of the guide rail 3"), which essentially corresponds to the difference between the longitudinal extension LF of the guide carriage 2 in the longitudinal direction of the guide rail 3 and the longitudinal extension of the cage 5 in the longitudinal direction of the guide rail 3. Due to the fact that the maximum movement distance of the guide carriage 2 in the longitudinal direction of the guide rail 3 is limited in such a way, it is possible in the case of the profile rail guide 1 to limit the length of the guide rail 3 in the longitudinal direction of the guide rail 3 in each case in relation to the longitudinal extension LF of the guide carriage 2 in the longitudinal direction of the guide rail 3: The length of the guide rail 3 in the longitudinal direction of the guide rail 3 can be selected, for example, in such a way that it is identical to the longitudinal extension LF of the guide carriage 2 in the longitudinal direction of the guide rail 3.

In the case of the profile rail guide 1 according to FIGS. 1A-1C, it is assumed in an exemplary manner that the length of the guide rail 3 in the longitudinal direction of the guide rail 3 is identical to the longitudinal extension LF of the guide carriage 2. In the case of the profile rail guide 1 according to FIGS. 1A-1C, it appears to be problematic to apply a suitable measurement scale on the surface of the guide rail 3 in order to measure a distance covered by the guide carriage 2 in the longitudinal direction of the guide rail 3. Due to the fact that the length of the guide rail 3 in the longitudinal direction of the guide rail 3 is identical to the longitudinal extension LF of the guide carriage 2 in the present example, and at least a large portion of the intermediate space 4 between the guide rail 3 and the guide carriage 2 is moreover filled by the cage 5 and the rolling bodies 2A, it is a problem in the present example for space reasons to implement a sensor device on the guide carriage 2, which sensor device is moved together with the guide carriage in response to a movement of the guide carriage 2 in the longitudinal direction of the guide rail on the one hand, and which is moreover placed in such a way that it would be suitable for scanning a measurement scale arranged on the surface of the guide rail 3 (for any positions, in which the guide carriage 2 can be moved in the longitudinal direction of the guide rail 3).

To solve the above-mentioned problem, the distance measuring system 10 for measuring a distance covered by the guide carriage 2 in the longitudinal direction of the guide rail 3 is designed in such a way according to FIGS. 1A-1C that a measurement scale 15 extending in the longitudinal direction of the guide rail 3 is applied to a side surface 2.1 of the guide carriage 2 extending in the longitudinal direction of the guide rail 3. A sensor device 20 for scanning the measurement scale 15 is furthermore present, which, in the present example, is held by means of a holding device 20A in a position stationary with respect to the guide rail 3, so that the sensor device 20 has a distance from the measurement scale 15 and can in each case scan different regions of the measurement scale 15 in response to a movement of the guide carriage 2 in the longitudinal direction of the guide rail 3—as a function of the position of the guide carriage 2.

It is important to point out that in the present example according to FIG. 1, the side surface 2.1, to which the measurement scale 15 is applied, is an outer surface region of the guide carriage 2 (facing away from the guide rail 3), which extends parallel to the longitudinal direction of the guide rail 3 (i.e. parallel to the X axis) and parallel to the Y axis. In terms of the invention, another surface region of the guide carriage 2, which, on the one hand, extends parallel to the longitudinal direction of the guide rail 3 and, on the other hand, parallel to any other direction transverse to the X axis, for example a surface region (on a top side of the guide carriage 2 or on a bottom side of the guide carriage 2 in the region of one of the legs U1 or U2, respectively), which extends parallel to the X axis and parallel to the Z axis, would, on principle, alternatively also be suitable for applying the measurement scale 15 as "first side surface". As a function of the spatial position of the "first side surface" of the guide carriage 2, to which the measurement scale 15 is applied, the sensor device 20 would need to be arranged, optionally deviating from the position illustrated in FIG. 1, with respect to the guide carriage, in order to be able to be suitable for scanning the measurement scale 15.

Further details with regard to the measurement scale 15, the sensor device 20, and the distance measuring system 10 will be described below with reference to FIGS. 2 and 3.

Figure 2:
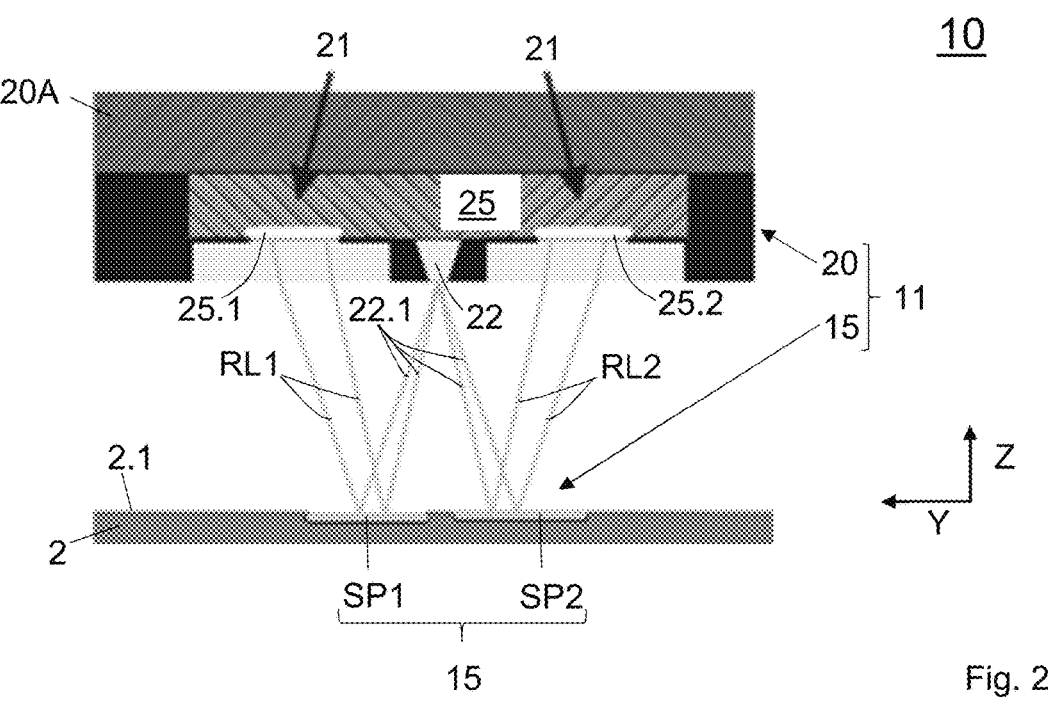
FIG. 2 schematically shows the mode of operation of a distance measuring system according to FIG. 1B and FIG. 1C comprising a linear encoder, which works according to the principle of the bright field measurement for measuring a distance covered in the longitudinal direction of a guide rail of a linear profile rail guide (illustrated in a cross section perpendicular to the longitudinal direction of the guide rail)
Figure 3:
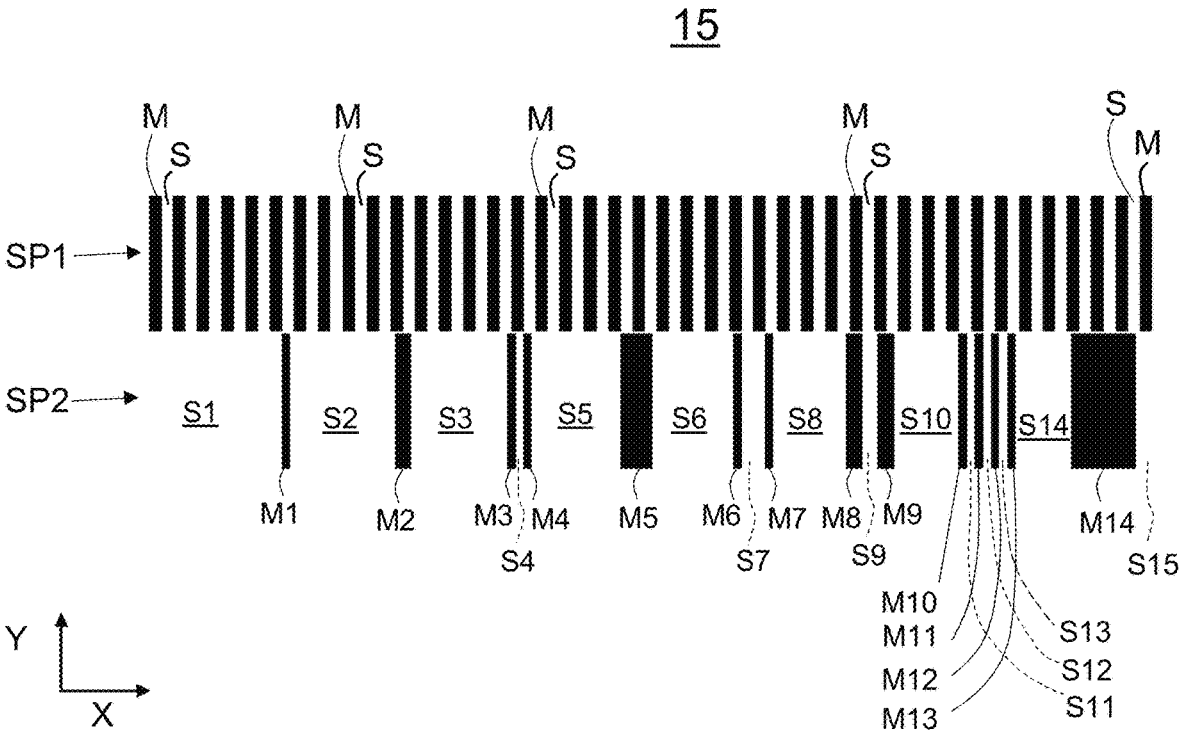
FIG. 3 schematically shows an exemplary embodiment of an arrangement of marking regions of a measurement scale applied to the surface of a guide carriage of a profile rail guide for a linear encoder according to FIG. 2.
Figure 4:
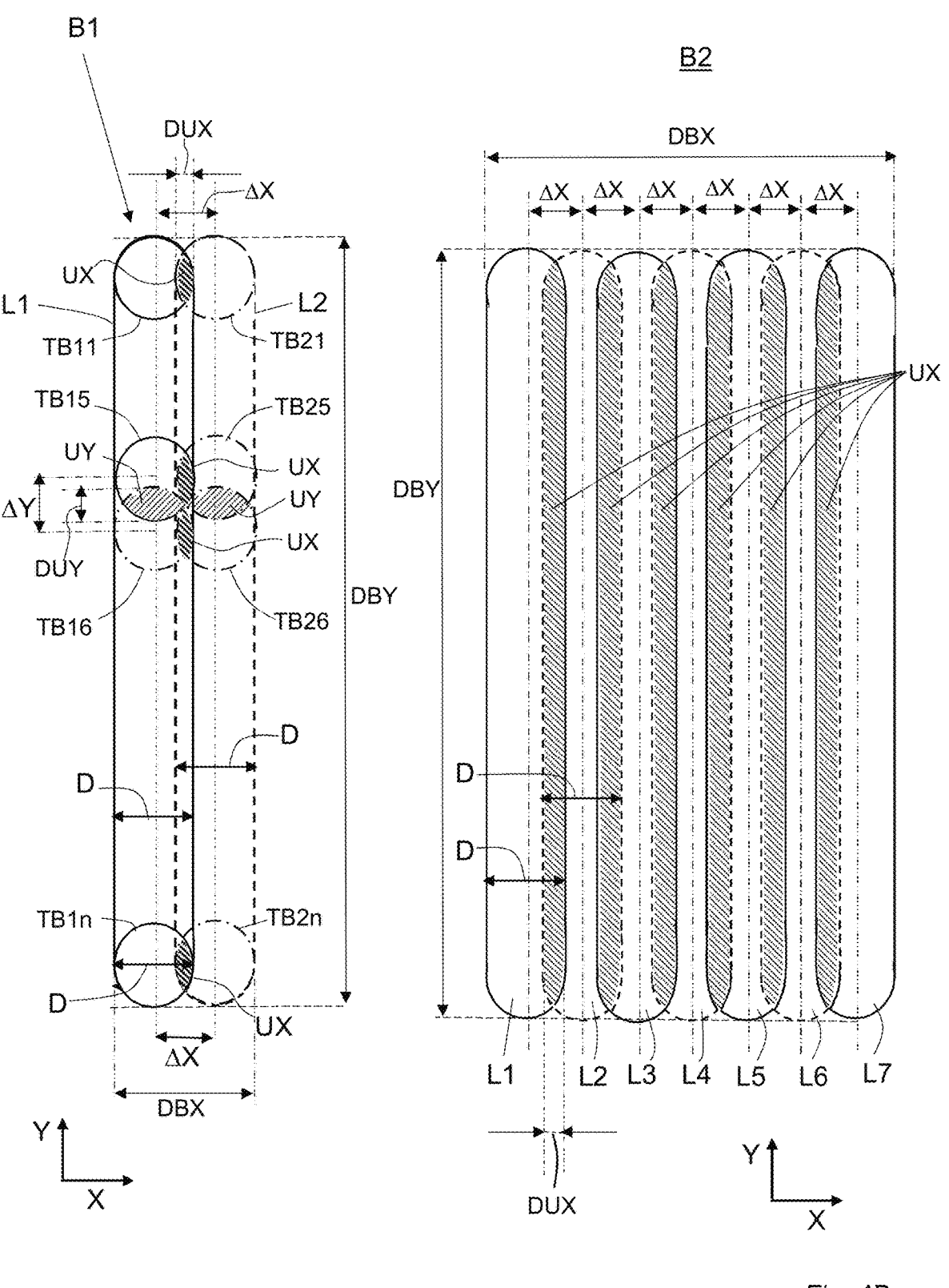
FIG. 4A shows a schematic illustration of a first marking region of the measurement scale according to FIG. 3 and of an arrangement of surface regions of the guide carriage, which are to be irradiated by means of light pulses of a pulsed laser beam, in order to provide for a provision of the first marking region on the surface of the guide carriage according to the invention.
FIG. 4B shows, analogously to FIG. 4A, a schematic illustration of a second marking region of the measurement scale according to FIG. 3 and of an arrangement of surface regions of the guide carriage, which are to be irradiated by means of light pulses of a pulsed laser beam, in order to provide for a provision of the second marking region on the surface of the guide carriage according to the invention.

The mode of operation of a distance measuring system 10 for measuring a distance covered in the longitudinal direction of the guide rail 3 of the linear profile rail guide 1 of the movable guide carriage 2, which is guided on the guide rail 3, of the profile rail guide 1, is illustrated schematically in FIGS. 2 and 3.

The distance measuring system 10 according to FIGS. 2 and 3 has an optical linear encoder 11, which works according to the principle of the bright field measurement and which provides for a measurement of a distance covered by the guide carriage 2 in the longitudinal direction of the guide rail 3. For this purpose, the linear encoder 11 comprises a measurement scale 15 extending in the longitudinal direction of the guide rail 3 comprising at least one track extending linearly in the longitudinal direction of the guide rail 3 comprising several mirror regions and marking regions arranged one behind the other so as to alternate, and at least one sensor device 20, which is formed to optically scan the at least one track of the measurement scale 15.

As suggested in FIGS. 1 and 2, the measurement scale 15 is formed on a first side surface 2.1 of the guide carriage 2. In order to provide for an optical scanning of the measurement scale 15, the sensor device 20 comprises a measuring head 21, which is arranged in a stationary manner with respect to the guide rail 3 and which is arranged so as to be located opposite the side surface 2.1 of the guide carriage 2, which is provided with the measurement scale 15, so that the measurement scale 15 is moved together with the guide carriage 2 and is moved in particular relative to the measuring head 21 in response to a movement of the guide carriage 2 in the longitudinal direction of the guide rail 3.

As suggested in FIGS. 2 and 3, the measurement scale 15 comprises two different tracks, which are arranged on the first side surface 2.1 and which extend parallel to one another in the longitudinal direction of the guide rail 3, comprising several mirror regions and marking regions, which are arranged one behind the other so as to alternate: a first track SP1, which is formed as incremental track with a plurality of equidistantly arranged marking regions, and a second track SP2, which is formed as reference track and has at least one marking region for encoding at least one reference position, or which can alternatively also have several marking regions arranged one behind the other in the longitudinal direction of the guide rail 3 for encoding several different reference positions.

As suggested in FIG. 3, each of the marking regions of the first track SP1 and of the second track SP2 of the measurement scale 15 in each case extends on the first side surface 2.1 of the guide carriage 2 in a line-like manner in the direction of the Y axis illustrated in FIGS. 2 and 3, i.e. transverse to the longitudinal direction of the measurement scale 15 or transverse to the longitudinal direction of the guide rail 3, respectively.

As suggested in FIG. 3, the first track SP1 (incremental track) comprises a plurality of marking regions M, which are identical with respect to their geometric shape and with respect to their spatial extension in the direction of the X axis and with respect to their spatial extension in the direction of the Y axis. A mirror region S is in each case formed between two adjacent marking regions M, which are arranged directly one behind the other in the direction of the X axis, wherein all mirror regions S of the first track SP1 are identical with respect to their spatial extension in the direction of the X axis and with respect to their spatial extension in the direction of the Y axis.

As furthermore suggested in FIG. 3, the second track SP2 (reference track) in the present example comprises several (here, for example, a total of fourteen) marking regions M1, M2, M3, M4, M5, M6, M7, M8, M9, M10, M11, M12, M13 or M14, respectively, which are arranged one behind the other in a row in the longitudinal direction of the guide rail 3.

In the case of the second track SP2, a mirror region is in each case also formed between two adjacent marking regions, which are arranged directly one behind the other in the direction of the X axis, so that the above-mentioned marking regions M1, M2, M3, M4, M5, M6, M7, M8, M9, M10, M11, M12, M13 or M14, respectively, are arranged one behind the other in a row so as to alternate with mirror regions S1, S2, S3, S4, S5, S6, S7, S8, S9, S10, S11, S12, S13, S14 or S15, respectively. The marking regions M1, M2, M3, M4, M5, M6, M7, M8, M9, M10, M11, M12, M13 and M14 of the second track SP2, however, are not all identical to one another with respect to their spatial extension in the direction of the X axis. The mirror regions S1, S2, S3, S4, S5, S6, S7, S8, S9, S10, S11, S12, S13, S14 and S15 are likewise not all identical to one another with respect to their spatial extension in the direction of the X axis. In this way, the different marking regions and mirror regions of the second track SP2 provide for an encoding of several different reference positions, which in each case unambiguously define several different absolute positions.

The measuring head 21 has a light source 22 (for example an LED), by means of which light in the form of a light beam 22.1 is emitted, which is directed essentially perpendicular at the side surface 2.1 of the guide carriage 2, so that a portion of the light emitted by the light source 22 impinges on the first track SP1 of the measurement scale 15, and another portion of the light 22.1 emitted by the light source 22 impinges on the second track SP2 of the measurement scale 15. The mode of operation of the linear encoder 11 requires a regular (mirror-like) reflection of the light 22.1 emitted by the light source 22 on the side surface 2.1 of the guide carriage 2, wherein each incident beam is to be reflected at the same angle to the surface normal, if possible.

As suggested in FIG. 2, that portion of the light 22.1 emitted by the light source 22, which impinges on the first track SP1 of the measurement scale 15, is reflected on the first track SP1; the light reflected on the first track SP1 of the measurement scale 15 is represented in FIG. 2 by means of light beams, which are identified with "RL1". That portion of the light 22.1 emitted by the light source 22, which impinges on the second track SP2 of the measurement scale 15, is accordingly reflected on the second track SP2; the light reflected on the first track SP1 of the measurement scale 15 is represented in FIG. 2 by means of light beams, which are identified with "RL2".

As furthermore suggested in FIG. 2, the measuring head 21 comprises an electronic light sensor chip 25, which is formed to detect the light RL1 reflected on the first track SP1 and the light RL2 reflected on the second track SP2, and to analyze the spatial distribution of the intensity of the reflected light RL1 and the spatial distribution of the intensity of the reflected light RL2.

For this purpose, the light sensor chip 25 comprises a first arrangement 25.1 of a plurality of photo sensors for detecting the light RL1 reflected on the first track SP1 of the measurement scale 15, and a second arrangement 25.2 of a plurality of photo sensors for detecting the light RL2 reflected on the second track SP2 of the measurement scale 15, and moreover further electronic elements (not illustrated in the figures), which are formed to evaluate corresponding output signals of the first arrangement 25.1 of photo sensors and/or output signals of the second arrangement 25.2 of photo sensors.

According to the invention, the measurement scale 15 is designed in such a way that the individual marking regions, i.e. the marking regions M of the first track SP1 and the marking regions M1, M2, M3, M4, M5, M6, M7, M8, M9, M10, M11, M12, M13 and M14 of the second track SP2, essentially absorb the light 22.1 emitted by the light source 22 and impinging on the respective marking regions, and do not reflect it in the direction of the first arrangement 25.1 of photo sensors and/or in the direction of the second arrangement 25.2 of photo sensors. In this case, the light RL1 reflected on the first track SP1 of the measurement scale 15 consists essentially of light, which has been reflected on the mirror regions S of the first track SP1. The light RL2 reflected on the second track SP2 of the measurement scale 15 accordingly consists essentially of light, which has been reflected on the mirror regions S1, S2, S3, S4, S5, S6, S7, S8, S9, S10, S11, S12, S13, S14 and S15 of the second track SP2.

Under the above-mentioned circumstances, the spatial distribution of the intensity of the light RL1 reflected on the first track SP1 of the measurement scale 15 has a spatial variation in the longitudinal direction of the guide rail 3, which corresponds to the spatial arrangement of the mirror regions S of the first track SP1 in the longitudinal direction of the guide rail 3. The spatial distribution of the intensity of the light RL2 reflected on the second track SP2 of the measurement scale 15 accordingly has a spatial variation in the longitudinal direction of the guide rail 3, which corresponds to the spatial arrangement of the mirror regions S1, S2, S3, S4, S5, S6, S7, S8, S9, S10, S11, S12, S13, S14 and S15 of the second track SP2 in the longitudinal direction of the guide rail 3.

The first arrangement 25.1 of photo sensors comprises a plurality of photo sensors (not illustrated in FIG. 2), which are arranged one behind the other in a row in the longitudinal direction of the guide rail 3. The second arrangement 25.2 of photo sensors accordingly comprises a plurality of photo sensors (not illustrated in FIG. 2), which are arranged one behind the other in a row in the longitudinal direction of the guide rail 3.

If the guide carriage 2 is moved in the longitudinal direction of the guide rail 3, the arrangement 25.1 of photo sensors and the arrangement 25.2 of photo sensors of the measuring head 21 are then also moved relative to the guide carriage 2 in the longitudinal direction of the first track SP1 or of the second track SP2, respectively, of the measurement scale 15. In this case, the intensity of the light RL1 reflected on the first track SP1, which is detected by the individual photo sensors of the first arrangement 25.1 of photo sensors, in each case shows a variation as a function of the position of the guide carriage 2 with respect to the longitudinal direction of the guide rail 3, in response to the movement of the guide carriage 2 in the longitudinal direction of the guide rail 3.

Due to the fact that the first track SP1 is formed as incremental track and the marking regions M of the first track SP1 are in each case arranged equidistantly one behind the other in the longitudinal direction of the guide rail 3, the intensity of the light RL1 reflected on the first track SP1, which is detected by the individual photo sensors of the first arrangement 25.1 of photo sensors, in each case shows a periodic variation as a function of the position of the guide carriage 2 with respect to the longitudinal direction of the guide rail 3 in response to the movement of the guide carriage 2 in the longitudinal direction of the guide rail 3. The individual photo sensors of the first arrangement 25.1 of photo sensors accordingly in each case generate output signals, which vary periodically as a function of the position of the guide carriage 2 with respect to the longitudinal direction of the guide rail 3 in response to a movement of the guide carriage 2 in the longitudinal direction of the guide rail 3.

It is generally possible to form the photo sensors of the first arrangement 25.1 of photo sensors in such a way that the individual photo sensors of the first arrangement 25.1 of photo sensors in each case generate output signals, the periodic variation of which as a function of the position of the guide carriage 2 with respect to the longitudinal direction of the guide rail 3 corresponds to the course of a mathematical sine function or cosine function, respectively, in response to a movement of the guide carriage 2 in the longitudinal direction of the guide rail 3. An evaluation of the output signals of the photo sensors of the first arrangement 25.1 of photo sensors accordingly provides for a determination of a distance covered by the guide carriage 2 in response to a movement in the longitudinal direction of the guide rail 3.

As mentioned, the second track SP2 is formed as reference track, wherein the marking regions M1, M2, M3, M4, M5, M6, M7, M8, M9, M10, M11, M12, M13 and M14 of the second track SP2 are not all identical to one another with respect to their spatial extension in the direction of the X axis, and the mirror regions S1, S2, S3, S4, S5, S6, S7, S8, S9, S10, S11, S12, S13, S14 and S15 of the second track SP2 are likewise not all identical to one another with respect to their spatial extension in the direction of the X axis.

In this case, the intensity of the light RL2 reflected on the second track SP2, which is detected by the individual photo sensors of the second arrangement 25.2 of photo sensors, in each case shows a variation as a function of the position of the guide carriage 2 with respect to the longitudinal direction of the guide rail 3, in response to the movement of the guide carriage 2 in the longitudinal direction of the guide rail 3, wherein this variation, however, does not have a periodic course as a function of the position of the guide carriage 2 with respect to the longitudinal direction of the guide rail 3.

The individual photo sensors of the second arrangement 25.2 of photo sensors accordingly in each case generate output signals, which do not vary periodically as a function of the position of the guide carriage 2 with respect to the longitudinal direction of the guide rail 3 in response to a movement of the guide carriage 2 in the longitudinal direction of the guide rail 3. An evaluation of the output signals of the photo sensors of the second arrangement 25.2 of photo sensors accordingly provides for a determination of an absolute position of the measuring head 21 with respect to the respective positions of the marking regions and mirror regions of the second track SP2 of the measurement scale 15.

Steel, in particular stainless steel, is generally used as material for guide rails and guide carriages of a linear profile rail guide. Surfaces of guide rails and guide carriages of this type, which are ground according to standard (i.e. unpolished), generally have a profile, which can deviate from a flat area in such a way that surfaces of this type effect a rather diffuse reflection of light.

If the light 22.1 emitted by the light source 22 were to be reflected diffusely on the respective mirror regions of the measurement scale 15, this could impact the measuring accuracy of the distance measuring system 10.

With regard to a realization of a measurement scale 15 on a first side surface of a guide carriage 2 according to FIGS. 2 and 3, it is thus expedient that prior to the application of the measurement scale 15 to the side surface 2.1 of the guide carriage 2 by means of the method according to the invention, the side surface 2.1 is initially subjected to a surface treatment in such a way that material is in particular removed slightly from the first side surface 2.1 of the guide carriage 2, in order to reduce a roughness, which is originally present, of the side surface 2.1 and to accordingly form the side surface 2.1 to be as smooth or flat as possible, respectively.

For the surface treatment of the profile rail guide, the surface of the guide carriage 2 is preferably polished in the region of the side surface 2.1. The polishing can take place in a variety of ways, but in particular by means of a pre-polishing by means of a ceramic grinding disk with a very fine grain size (400 or finer) and subsequent polishing by means of a polishing disk bound on the basis of rubber or synthetic resin. Alternative manufacturing types for polishing by means of polishing disk are laser polishing or electropolishing or polishing by means of polishing brushes.

After a surface treatment of this type of the side surface 2.1, the individual marking regions of the measurement scale 15 are subsequently applied to the first side surface 2.1 of the guide carriage 2 with the help of a pulsed laser. Examples for the application of the individual marking regions of the measurement scale 15 according to the method according to the invention will be described below, for example with reference to FIGS. 4A and 4B.

FIG. 4A shows (in a top view onto the side surface 2.1) a first region B1 of the side surface 2.1, in which the side surface 2.1 is to be treated with the help of a pulsed laser, in order to form a microstructure, which represents one of the marking regions of the first track SP1 or of the second track SP2 of the measurement scale 15, in the first region B1.

Due to the fact that the respective marking regions of the first track SP1 or of the second track SP2 of the measurement scale 15 in each case extends in a line-like manner transverse to the longitudinal direction of the measurement scale 15 (i.e. in the direction of the X axis according to FIGS. 2 and 3), it is assumed in the example according to FIG. 4A that the first region B1 essentially has the shape of a rectangle, which has an extension DBX in the longitudinal direction of the measurement scale 15 and an extension DBY transverse to the longitudinal direction of the measurement scale 15 (i.e. in the direction of the Y axis according to FIGS. 2 and 3).

In order to introduce a microstructure in the region B1, which represents one of the marking regions of the first track SP1 or of the second track SP2 of the measurement scale 15, a pulsed laser for generating a laser beam is provided, wherein the laser generates the laser beam by means of a sequence of several light pulses. The laser beam is directed at the first region B1 of the first side surface 2.1 in such a way that only a subregion of the first region B1 is irradiated by means of each individual light pulse of the generated sequence of several light pulses.

It is assumed in the example according to FIG. 4A that in a plane perpendicular to the propagation direction of the laser beam, the laser beam has an essentially circular beam profile with a diameter DL, so that, when impinging on the side surface 2.1, an individual light pulse of the laser beam irradiates a region of the side surface 2.1, which has the shape of a circle, with laser light, wherein, in the present example, the diameter of this region, which is irradiated by means of an individual light pulse, essentially corresponds to the diameter DL of the laser.

It is assumed in the present example that, when an individual light pulse of the laser beam impinges on the side surface 2.1, the side surface 2.1 is irradiated in such a way that the side surface 2.1 is changed in a circular region, which has the shape of a circle having a diameter D, due to the irradiation by means of the individual light pulse, in such a way that the side surface 2.1 has a change in the form of a spatial modulation in the above-mentioned circular region with the diameter D (compared to the shape of the surface prior to the irradiation by means of the respective individual light pulse). In the example according to FIG. 4A, a "subregion of the first region B1, which is irradiated by means of the respective individual light pulse", is accordingly in each case illustrated as a region of the side surface 2.1, which is limited by a circle with the diameter D.

It is additionally assumed in particular in the example according to FIG. 4A that the laser beam is directed at the first region B1 of the first side surface 2.1 in such a way that the spatial extension D of the subregion of the first region B1, which is irradiated by means of the respective individual light pulse, in the longitudinal direction of the measurement scale 15 (i.e. in the direction of the X axis) is smaller than the spatial extension DBX of the first region B1 in the longitudinal direction of the measurement scale 15, and that the spatial extension D of the subregion, which is irradiated by means of the respective individual light pulse, transverse to the longitudinal direction of the measurement scale 15 (i.e. in the direction of the Y axis), is smaller than the spatial extension DBY of the first region B1 transverse to the longitudinal direction of the measurement scale 15.

In the example according to FIG. 4A, the laser beam is moved relative to the guide carriage 2 in such a way that at least several of the light pulses of the generated sequence of several light pulses irradiate several different subregions of the first region B1, which are arranged spatially distributed relative to one another, sequentially in time, wherein, for each individual one of the several different irradiated subregions, at least one other one of the several different irradiated subregions is present, which is offset to the respective individual one of the several different irradiated subregions in the longitudinal direction of the measurement scale 15 (i.e. in the direction of the X axis) and/or transverse to the longitudinal direction of the measurement scale 15 (i.e. in the direction of the Y axis) in such a way that the respective individual one of the several different irradiated subregions and the at least one other one of the several different irradiated subregions have an overlap, and wherein the several different irradiated subregions together form a region of the first side surface, which is congruent with the first region B1.

According to this, the laser beam is moved two-dimensionally (i.e. in the direction of the X axis and in the direction of the Y axis) over the first region B1 of the first side surface 2.1 of the guide carriage 2, which corresponds to a marking region of the measurement scale 15 to be applied, so that different subregions of the first region B1 are irradiated one after the other.

The irradiation of a subregion by means of one of the light pulses locally effects a slight removal and/or a spatial redistribution of the material (steel) forming the first side surface 2.1 of the guide carriage 2, so that the shape of the surface in the irradiated subregion is changed after the irradiation by means of a light pulse. Due to the fact that the laser beam is moved over the first region B1 in such a way that each of the different irradiated subregions has to have an overlap with at least one other one of the irradiated subregions, it is attained that the first side surface 2.1 of the guide carriage 2 in the first region B1 has a spatial modulation after the irradiation by means of the light pulses, so that the first side surface 2.1 in the first region B1—compared to its state prior to the irradiation by means of the light pulses—has an increased roughness. The irradiation of the first region by means of the light pulses provides for a microstructuring of the first side surface in such a way that a surface, which is smooth prior to the irradiation, has an arrangement of elevations ("microstructure"), which represents an essentially even roughening of the surface, in the first region B1, after the irradiation in the entire first region.

In the example according to FIG. 4A, the diameter DL of the laser beam or the diameter D of the subregions, which are in each case irradiated by means of a light pulse, of the first region B1, respectively, in relation to the extension DBX of the first region B1 in the longitudinal direction of the measurement scale 15 and in relation to the extension DBY of the first region B1 transverse to the longitudinal direction of the measurement scale 15 is selected in such a way that $$D<DBX<2D \text{ and}$$

$$D<DBY<nD,$$

wherein n is a natural number (with $n \geq 2$).

It is furthermore assumed that the different subregions, which are in each case irradiated by means of a light pulse, are arranged in the first region B1 in such a way that a first group of subregions of the entirety of all irradiated subregions with a number of a total of n subregions is present, wherein the individual subregions of these first groups are arranged in a row extending transverse to the longitudinal direction of the measurement scale 15 (i.e. in the direction of the Y axis) and are thereby arranged relative to one another in such a way that the center points of the different subregions are offset relative to one another by predetermined distances, in each case transverse to the longitudinal direction of the measurement scale 15. As illustrated in FIG. 4A, the above-mentioned first group of subregions in its entirety forms a first line-shaped section of the first region B1, which is identified with the reference numeral "D" in FIG. 4A, the extension of which transverse to the longitudinal direction of the measurement scale 15 is identical to the extension DBY of the first region B1, and the extension of which in the longitudinal direction of the measurement scale 15 is identical to the diameter D of the subregions, which are in each case irradiated by means of a light pulse.

It is important to point out that not all of the subregions, which are arranged in the first line-shaped section L1, of the above-mentioned first group of subregions are illustrated in FIG. 4A: Only four of the respective subregions of the above-mentioned first group of subregions are illustrated graphically (for the sake of clarity of the illustration), wherein these four subregions are identified with the reference numerals "TB11", "TB15", "TB16", and "TB1$n$" in FIG. 4A. The two subregions "TB11" and "TB1$n$" are thereby arranged offset relative to one another in the direction of the Y axis in such a way that the subregion "TB11" is arranged on one end of the first line-shaped section L1 with respect to the Y axis, and the subregion "TB11" is arranged on the other end of the first line-shaped section L1 (i.e. located opposite the subregion "TB11"). The two subregions "TB15" and "TB16" are arranged relative to one another in such a way that the center point of the subregion "TB16" is offset by a distance $\Delta Y$ relative to the center point of the subregion "TB15" in the direction of the Y axis. In the present example, the distance $\Delta Y$ is selected in such a way that the distance $\Delta Y$ is preferably greater than or equal to half the diameter D of the subregions, which are in each case irradiated by means of a light pulse, and the distance $\Delta Y$ is preferably smaller than 80% of the diameter D of the subregions, which are in each case irradiated by means of a light pulse (i.e. D/2 $\Delta Y < 0.8*D$). The two subregions "TB15" and "TB16" thus have an overlap, which is illustrated as a shaded area in FIG. 4A which is identified with the reference numeral "UY". In the direction of the Y axis, the overlap UY has an extension DUY, which preferably lies in the range of 20-50% of the spatial extension D of the subregion, which is irradiated by means of an individual light pulse, in the direction of the Y axis.

The extension DUY is associated with the diameter D of the subregions, which are in each case irradiated by means of a light pulse, and with the above-mentioned distance $\Delta Y$ according to the following equation: DUY=D–$\Delta Y$.

With regard to those subregions of the above-mentioned first group of subregions, which are not illustrated in FIG. 4A, it shall be pointed out that the center points of the different subregions relative to one another can in each case be offset transverse to the longitudinal direction of the measurement scale 15 in such a way that for each individual one of the different subregions, which is irradiated by means of a light pulse, another subregion is present, which is irradiated by means of a light pulse and the center point of which transverse to the longitudinal direction of the measurement scale 15 (i.e. in the direction of the Y axis) is offset relative to the center point of the respective individual one of the different subregions, which are irradiated by means of a light pulse, by a distance, which corresponds to the distance $\Delta Y$ illustrated in FIG. 4A between the center points of the subregions "TB15" and "TB16". Each of the subregions of the above-mentioned first group of subregions accordingly has an overlap at least with another subregion of the above-mentioned first group of subregions, which corresponds to the overlap UY of the subregions "TB15" and "TB16" illustrated in FIG. 4A.

As can be seen from FIG. 4A, the different subregions, which are in each case irradiated by means of a light pulse, are arranged in the first region B1 in such a way that additionally to the above-described first group of subregions, a second group of subregions of the entirety of all irradiated subregions is present with a number of a total of n subregions, wherein the individual subregions of this second group are arranged in a row extending transverse to the longitudinal direction of the measurement scale 15 (i.e. in the direction of the Y axis) and are thereby arranged relative to one another in such a way that the center points of the different subregions are likewise offset relative to one another in each case transverse to the longitudinal direction of the measurement scale 15 by specified distances. As illustrated in FIG. 4A, the above-mentioned second group of subregions in its entirety forms a second line-shaped section of the first region B1, which is identified with the reference numeral "L2" in FIG. 4A, the extension of which transverse to the longitudinal direction of the measurement scale 15 is identical to the extension DBY of the first region B1, and the extension of which in the longitudinal direction of the measurement scale 15 is identical to the diameter D of the subregions, which are in each case irradiated by means of a light pulse.

As suggested in FIG. 4A, the individual subregions, which are irradiated by means of light pulses, of the second group of subregions are arranged in the second line-shaped section L2 of the first region B1 transverse to the longitudinal direction of the measurement scale 15 so as to be spatially distributed in a way, which, analogously to the spatial distribution of the individual subregions, which are irradiated by means of light pulses, corresponds to the first group of subregions in the first line-shaped section L1 in the direction of the Y axis.

Likewise, not all of the subregions of the second group of subregions, which are arranged in the second line-shaped section L1, are illustrated in FIG. 4A: Only four of the respective subregions of the above-mentioned second group of subregions are illustrated graphically (for the sake of clarity of the illustration), wherein these four subregions are identified with the reference numerals "TB21" and "TB2$n$" in FIG. 4A. The two subregions "TB21", "TB25", "TB26", and "TB2$n$" are thereby arranged offset relative to one another in the direction of the Y axis in such a way that the subregion "TB21" is arranged on one end of the second line-shaped section L2 with respect to the Y axis and the subregion "TB2$n$" is arranged on the other end of the second line-shaped section L2 (i.e. located opposite the subregion "TB21").

Moreover, the center points of the different subregions of the second group of subregions are arranged offset relative to one another in the second line-shaped section L2 of the first region B1 in each case transverse to the longitudinal direction of the measurement scale 15 in such a way that for each individual one of the different subregions, which are irradiated by means of a light pulse, another subregion is present, which is irradiated by means of a light pulse and the center point of which, transverse to the longitudinal direction of the measurement scale 15 (i.e. in the direction of the Y axis), is offset relative to the center point of the respective individual one of the different subregions, which are irradiated by means of a light pulse, by a distance, which corresponds to the distance $\Delta Y$ illustrated in FIG. 4A between the center points of the subregions "TB15" and "TB16". Each of the subregions of the second group of subregions accordingly has an overlap with another subregion of the second group of subregions, which corresponds to the overlap UY of the subregions "TB15" and "TB16" illustrated in FIG. 4A.

As mentioned, the diameter DL of the laser beam or the diameter D of the subregions of the first region B1, respectively, which are in each case irradiated by means of a light pulse, in relation to the extension DBX of the first region B1 in the longitudinal direction of the measurement scale 15, is selected in such a way in the example according to FIG. 4A that the relation D<DBX<2 D is fulfilled. Due to the fact that the first line-shaped section L1 of the first region B1 as well as the second line-shaped section L2 of the first region B1 have an extension in the longitudinal direction of the measurement scale 15, which is identical to the diameter D of the subregions, which are in each case irradiated by means of a light pulse, the subregions of the first group of subregions and the subregions of the second group of subregions are arranged relative to one another in such a way that the center points of the subregions of the first group of subregions lie on a first straight line extending in the direction of the Y axis, and the center points of the subregions of the second group of subregions lie on a second straight line, which likewise extends in the direction of the Y axis, wherein the first straight line and the second straight line are arranged parallel to one another, and, in the longitudinal direction of the measurement scale 15, have a distance $\Delta X$, which is smaller than the diameter D of the subregions, which are in each case irradiated by means of a light pulse.

The first line-shaped section L1 of the first region B1 and the second line-shaped section L2 of the second region B1 accordingly have an overlap, which extends in the direction of the Y axis over a length, which corresponds to the extension DBY of the first region B1 in the direction of the Y axis, and which extends in the longitudinal direction of the measurement scale 15 over a length DUX (illustrated in FIG. 4A). The extension DUX of the overlap of the first line-shaped section L1 of the first region B1 and of the second line-shaped section L2 of the first region B1 in the longitudinal direction of the measurement scale 15 is associated with the diameter D of the subregions, which are in each case irradiated by means of a light pulse, and with the above-mentioned distance $\Delta X$ according to the following equation: DUX=D−$\Delta X$.

The subregions of the first group of subregions and the subregions of the second group of subregions are accordingly arranged relative to one another in such a way that each subregion of the first group of subregions generally has an overlap with at least one subregion of the second group of subregions, which has an extension in the longitudinal direction of the measurement scale 15, which is identical to the above-mentioned extension DUX of the overlap between the first line-shaped section L1 of the first region B1 and the second line-shaped section L2 of the second region B1 in the longitudinal direction of the measurement scale 15.

It is accordingly illustrated in an exemplary manner in FIG. 4A that the subregion TB11 and the subregion TB21 are arranged offset in the longitudinal direction of the measurement scale 15 in such a way that the subregion TB11 and the subregion TB21 have an overlap, which is illustrated in FIG. 4A as a shaded area, which is identified with the reference numeral "UX". In the direction of the X axis, this overlap UX has an extension, which is identical to the above-mentioned extension DUX.

It is additionally illustrated in an exemplary manner in FIG. 4A that the subregion TB$1n$ and the subregion TB$2n$ are arranged offset in the longitudinal direction of the measurement scale 15 in such a way that the subregion TB$1n$ and the subregion TB$2n$ have an overlap, which is illustrated in FIG. 4A as a shaded area, which is likewise identified with the reference numeral "UX". In the direction of the X axis, this overlap UX accordingly has an extension, which is identical to the above-mentioned extension DUX.

It is additionally illustrated in an exemplary manner in FIG. 4A that the subregion TB15 and the subregion TB25 are arranged offset in the longitudinal direction of the measurement scale 15 in such a way that the subregion TB15 and the subregion TB25 have an overlap, which is illustrated as a shaded area in FIG. 4A, which is likewise identified with the reference numeral "UX" and which, in the direction of the X axis, accordingly has an extension, which is identical to the above-mentioned extension DUX.

As moreover illustrated in FIG. 4A, the subregion TB16 and the subregion TB26 are arranged offset in the longitudinal direction of the measurement scale 15 in such a way that the subregion TB16 and the subregion TB26 have an overlap, which is illustrated as a shaded area in FIG. 4A, which is likewise identified with the reference numeral "UX", and which, in the direction of the X axis, accordingly has an extension, which is identical to the above-mentioned extension DUX.

As can be seen from FIG. 4A, the two subregions TB25 and TB26 are arranged relative to one another in such a way that the center point of the subregion TB26 is offset by the distance $\Delta Y$ relative to the center point of the subregion TB25 in the direction of the Y axis, so that the two subregions TB25 and TB26 have an overlap in the direction of the Y axis, which is illustrated as a shaded area in FIG. 4A, which is identified with the reference numeral "UY".

As can be seen from FIG. 4A, the subregions TB15, TB16, TB25, and TB26 of the first region B1, which are irradiated by means of a respective individual light pulse, accordingly have overlaps UX and UY in two dimensions (i.e. in the longitudinal direction of the at least one track as well as transverse to the longitudinal direction of the at least one track).

All of the subregions of the first region B1, which are irradiated by means of an individual light pulse, accordingly each have overlaps UX and UY in two dimensions (i.e. in the longitudinal direction of the at least one track as well as transverse to the longitudinal direction of the at least one track).

The distance $\Delta X$ is preferably selected in such a way that the extension DUX of the overlap UX in the direction of the X axis preferably lies in the range of 20-50% of the spatial extension D of the subregion, which is irradiated by means of an individual light pulse, in the direction of the X axis.

FIG. 4B shows—similarly as FIG. 4A (in a top view onto the side surface 2.1) a first region B2 of the side surface 2.1, in which the side surface 2.1 is to be treated with the help of a pulsed laser, in order to form a microstructure in the first region B2, which represents one of the marking regions of the first track SP1 or of the second track SP2 of the measurement scale 15.

Similarly as in the example according to FIG. 4A, it is assumed in the example according to FIG. 4B that the first region B2 essentially has the shape of a rectangle, which has an extension DBX in the longitudinal direction of the measurement scale 15, and an extension DBY transverse to the longitudinal direction of the measurement scale 15 (i.e. in the direction of the Y axis according to FIGS. 2 and 3).

Similarly as in the example according to FIG. 4A, a pulsed laser for generating a laser beam is provided in the example according to FIG. 4B for producing a microstructure, which is to be formed in the region B2, wherein the laser generates the laser beam by means of a sequence of several light pulses, and the laser beam is directed at the first region B2 of the first side surface 2.1 in such a way that only a subregion of the first region B2 is irradiated by means of each individual light pulse of the generated sequence of several light pulses.

Similarly as in the example according to FIG. 4A, it is assumed in the example according to FIG. 4B that in a plane perpendicular to the propagation direction of the laser beam, the laser beam has an essentially circular beam profile with a diameter DL, so that, when impinging on the side surface 2.1, an individual light pulse of the laser beam irradiates a region of the side surface 2.1, which has the shape of a circle, with laser light, wherein, in the present example, the diameter of this region, which is irradiated by means of an individual light pulse, essentially corresponds to the diameter DL of the laser.

Similarly as in the example according to FIG. 4A, it is assumed in the example according to FIG. 4B that, when an individual light pulse of the laser beam impinges on the side surface 2.1, the side surface 2.1 is irradiated in such a way that the side surface 2.1 is changed in a circular region, which has the shape of a circle having a diameter D, due to the irradiation by means of the individual light pulse, in such a way that the side surface 2.1 has a change in the form of a spatial modulation in the above-mentioned circular region with the diameter D (compared to the shape of the surface prior to the irradiation by means of the respective individual light pulse). In the example according to FIG. 4B, a "subregion of the first region B2, which is irradiated by means of the respective individual light pulse", is accordingly in each case illustrated as a region of the side surface 2.1, which is limited by a circle with the diameter D.

Similarly as in the example according to FIG. 4A, it is additionally assumed in the example according to FIG. 4B that the laser beam is directed at the first region B2 of the first side surface 2.1 in such a way that the spatial extension D of the subregion of the first region B2, which is irradiated by means of the respective individual light pulse, in the longitudinal direction of the measurement scale 15 (i.e. in the direction of the X axis) is smaller than the spatial extension DBX of the first region B2 in the longitudinal direction of the measurement scale 15, and that the spatial extension D of the subregion, which is irradiated by means of the respective individual light pulse, transverse to the longitudinal direction of the measurement scale 15 (i.e. in the direction of the Y axis), is smaller than the spatial extension DBY of the first region B2 transverse to the longitudinal direction of the measurement scale 15.

The example according to FIG. 4B essentially differs from the example according to FIG. 4A in that even though the extension DBY of the first region B2 according to FIG. 4B transverse to the longitudinal direction of the measurement scale 15 (i.e. in the direction of the Y axis) is identical to the extension of the first region B1 according to FIG. 4A transverse to the longitudinal direction of the measurement scale 15, the spatial extension DBX of the first region B2 in the longitudinal direction of the measurement scale 15 is to be essentially larger, however, than the extension of the first region B1 according to FIG. 4A in the longitudinal direction of the measurement scale 15. The latter accounts for the requirement that the measurement scale 15 has different marking regions in the region of the second track SP2, the extensions of which in the longitudinal direction of the measurement scale 15 are different to a significant extent.

In the example according to FIG. 4A, it is accordingly assumed that the spatial extension DBX of the first region B2 in the longitudinal direction of the measurement scale 15 is to be significantly larger than twice the spatial extension D of the subregion of the first region B2, which is irradiated by means of the respective individual light pulse, in the longitudinal direction of the measurement scale 15 (i.e. DBX>2*D).

In the example according to FIG. 4B, the laser beam is likewise moved relative to the guide carriage 2 in such a way that at least several of the light pulses of the generated sequence of several light pulses irradiate several different subregions of the first region B2, which are arranged so as to be spatially distributed relative to one another, sequentially in time, wherein, for each individual one of the several different irradiated subregions, at least one other one of the several different irradiated subregions is present, which is offset to the respective individual one of the several different irradiated subregions in the longitudinal direction of the measurement scale 15 (i.e. in the direction of the X axis) and/or transverse to the longitudinal direction of the measurement scale 15 (i.e. in the direction of the Y axis) in such a way that the respective individual one of the several different irradiated subregions and the at least one other one of the several different irradiated subregions have an overlap, and wherein the several different irradiated subregions together form a region of the first side surface, which is congruent with the first region B2.

In the example according to FIG. 4B, the laser beam is thus likewise moved two-dimensionally (i.e. in the direction of the X axis and in the direction of the Y axis) over the first region B2 of the first side surface 2.1 of the guide carriage 2, which corresponds to a marking region of the measurement scale 15 to be applied, so that different subregions of the first region B2 are irradiated one after the other.

In contrast to the example according to FIG. 4A, it is assumed in the example according to FIG. 4B that due to the relatively large spatial extension DBX of the first region B2 in the longitudinal direction of the measurement scale 15, compared to the spatial extension D of the subregion, which is irradiated by means of the respective individual light pulse, the different subregions, which are in each case irradiated by means of a light pulse, are arranged in the first region B2 in such a way that more than two different groups of subregions of the entirety of all irradiated subregions are present, wherein each of these more than two different groups of subregions in each case comprises several of the subregions (with a number n of subregions as in the example according to FIG. 4A) and the individual subregions of each of the more than two different groups are arranged in a row extending transverse to the longitudinal direction of the measurement scale 15 (i.e. in the direction of the Y axis) and are thereby arranged relative to one another in such a way that the center points of the different subregions are offset relative to one another by predetermined distances, in each case transverse to the longitudinal direction of the measurement scale 15. The more than two different groups of subregions thereby differ in that the center points of the subregions of one of the different groups of subregions are offset relative to the center points of the subregions of every other one of the different groups of subregions in the longitudinal direction of the measurement scale 15 (i.e. in the direction of the X axis) by predetermined distances.

In the example according to FIG. 4B, it is assumed that seven different groups of subregions are present (alternatively, more or fewer different groups could be present). As illustrated in FIG. 4B, the respective subregions of each of the seven different groups of subregions in each case form a line-shaped section of the first region B2, the extension of which transverse to the longitudinal direction of the measurement scale 15 is identical to the extension DBY of the first region B2, and the extension of which in the longitudinal direction of the measurement scale 15 is identical to the diameter D of the subregions, which are in each case irradiated by means of a light pulse.

Due to the fact that the center points of the subregions of one of the seven different groups of subregions are offset relative to the center points of the subregions of every other one of the seven different groups of subregions in the longitudinal direction of the measurement scale 15 (i.e. in the direction of the X axis) by predetermined distances, the subregions of the seven different groups form a total of seven line-shaped sections of the first region B2, which are identified in FIG. 4B with the reference numerals "L1", "L2","L3", "L4", "L5", "L6" or "L7", respectively.

The individual subregions, which are irradiated by means of a light pulse and which are in each case assigned to one of the seven line-shaped sections L1, L2, L3, L4, L5, L6 or L7, respectively, of the first region B2, are not illustrated in FIG. 4B. It is assumed in this context that the arrangement of the individual subregions, which are irradiated by means of a light pulse, of the seven line-shaped sections L1, L2, L3, L4, L5, L6 or L7, respectively, is analogous to the arrangement of the individual subregions, which are irradiated by means of a light pulse, in the first line-shaped section L1 or in the second line-shaped section L2, respectively, of the first region B1 according to FIG. 4A.

As suggested in FIG. 4B, the center points of the individual subregions, which are irradiated by means of a light pulse, in each of the seven line-shaped sections L1, L2, L3, L4, L5, L6 or L7, respectively, of the first region B2 in each case lie on a straight line, which extends in the direction of the Y axis. In the example according to FIG. 4B, seven line-shaped sections L1, L2, L3, L4, L5, L6 or L7, respectively, of the first region B2 are arranged relative to one another in such a way that the center points of those subregions, which are irradiated by means of a light pulse and which are assigned to the line-shaped section L1, relative to the center points of those subregions, which are irradiated by means of light pulses and which are assigned to the line-shaped section L2, with respect to the longitudinal direction of the measurement scale 15 (i.e. in the direction of the X axis) have a distance ΔX, which is smaller than the diameter D of the subregions, which are in each case irradiated by means of a light pulse. The center points of those subregions, which are irradiated by means of a light pulse and which are assigned to the line-shaped section L2, relative to the center points of those subregions, which are irradiated by means of a light pulse and which are assigned to the line-shaped section L3, with respect to the longitudinal direction of the measurement scale 15 (i.e. in the direction of the X axis) accordingly likewise have the above-mentioned distance ΔX. The remaining line-shaped sections L4, L5, L6 or L7, respectively, of the first region B2 are arranged in an analogous way relative to the line-shaped sections L1, L2 and L3 of the first region B2: The center points of the individual subregions, which are irradiated by means of a light pulse, of the seven line-shaped sections L1, L2, L3, L4, L5, L6, or L7, respectively, in each case lie on different straight lines, which extend in the direction of the Y axis and which are in each case arranged equidistantly one after the other in the longitudinal direction of the measurement scale 15, wherein the distance between two respective adjacent ones of these straight lines corresponds to the above-mentioned distance ΔX (as illustrated in FIG. 4B).

Due to the fact that it is assumed that the distance ΔX is smaller than the diameter D of the subregions, which are in each case irradiated by means of a light pulse, the line-shaped sections L1, L2, L3, L4, L5, L6 or L7, respectively, of the first region B2 are arranged to be offset in the longitudinal direction of the measurement scale 15 in such a way that each of the line-shaped sections L1, L2, L3, L4, L5, L6 or L7, respectively, in each case has an overlap with another one of the line-shaped sections L1, L2, L3, L4, L5, L6 or L7, respectively, which is illustrated in FIG. 4B as a shaded area and which is in each case identified with the reference numeral "UX". In the direction of the X axis, the respective overlap UX between two respective ones of the line-shaped sections L1, L2, L3, L4, L5, L6 or L7, respectively, accordingly has an extension DUX, which is associated with the above-mentioned distance ΔX according to the following equation: DUX=D−ΔX.

Each of the subregion, which is irradiated by means of a light pulse and which is assigned to one of the line-shaped sections L1, L2, L3, L4, L5, L6 or L7, respectively, accordingly has an overlap with at least one other subregion, which is irradiated by means of a light pulse and which is assigned to another one of the line-shaped sections L1, L2, L3, L4, L5, L6 or L7, respectively, in the region of one of the overlaps UX illustrated in FIG. 4B.

In the example according to FIG. 4B, the distance ΔX is preferably selected in such a way that the extension DUX of the overlap UX in the direction of the X axis preferably lies in the range of 20-50% of the spatial extension D of the subregion, which is irradiated by means of an individual light pulse, in the direction of the X axis.

Realizations of a measurement scale 15 illustrated in FIGS. 2 and 3 on a side surface of a guide carriage (made of steel) will be described below with reference to FIGS. 5-8.

FIGS. 5-8 show realizations of a measurement scale 15 illustrated in FIGS. 2 and 3 on a side surface of a guide carriage of a profile rail guide, in the case of which a short-pulse laser, for example, with a wavelength of 355 nm and a maximum output power of 300 mW as well as a pulse duration of less than 15 nanoseconds and an aperture opening of 16 mm was used for introducing the microstructure in the respective marking regions of the measurement scale 15 on the side surface of the guide carriage. To introduce the microstructure, it was possible to move the laser beam at a scan speed of 200 mm per second relative to the guide carriage, wherein the laser generated a sequence of light pulses with a repetition rate (pulse frequency) of 60 kHz, and generally 90% of the maximum output power was selected for the laser power.

The laser beam had a circular profile and was applied to the side surface of the guide carriage in such a way that an individual light pulse of the laser beam on the side surface of the guide carriage irradiated a subregion with a diameter D of approx. 8 μm.

FIG. 5 shows a top view through a microscope onto a measurement scale 15 according to FIG. 3, which is applied to a side surface of a guide carriage by means of the method according to the invention with the help of the above-mentioned short-pulse laser. The upper half of FIG. 5 shows a top view onto the first track SP1 (incremental track) of the measurement scale 15, and the lower half of FIG. 5 shows a top view onto the second track SP2 (reference track) of the measurement scale 15.

The bright regions in FIG. 5 correspond to the respective mirror regions of the measurement scale 15, while the dark regions in FIG. 5 show the respective marking regions of the measurement scale 15, which were applied by means of the above-mentioned short-pulse laser to the side surface of the guide carriage.

The side surface illustrated in FIG. 5 was polished prior to the application of the measurement scale 15, so that the average roughness value (Ra) of the side surface was Ra=0.007 μm (measured by means of a laser scanning microscope). The individual marking regions of the first track SP1 (incremental track) illustrated in the upper half in FIG. 5 have an extension of approximately 100 μm in the longitudinal direction of the measurement scale 15 (i.e. in the direction of the X axis of a coordinate system specified in FIG. 5).

The marking regions of the measurement scale 15 illustrated in FIG. 5 were provided according to the example illustrated in FIG. 4B, whereby the parameters D and ΔX were selected as follows: D=8 μm and ΔX=5 μm.

In the case of the side surface illustrated in FIG. 5, the irradiation by means of the laser pulses had the effect that the side surface in the respective marking regions experienced a roughening, which is homogenous over the entire area of the respective marking region, whereby the average roughness value (Ra) in the marking regions was Ra=0.162 μm (measured by means of a laser scanning microscope).

As a result of this roughening, the respective marking regions of the measurement scale illustrated in FIG. 5 do not show a direct reflection of the light, which is incident on the marking regions (for example perpendicular to the side surface) and can thus be seen in FIG. 5 as homogenous dark (black) surface areas in a light, which is incident essentially perpendicular to the side surface.

Figure 6:
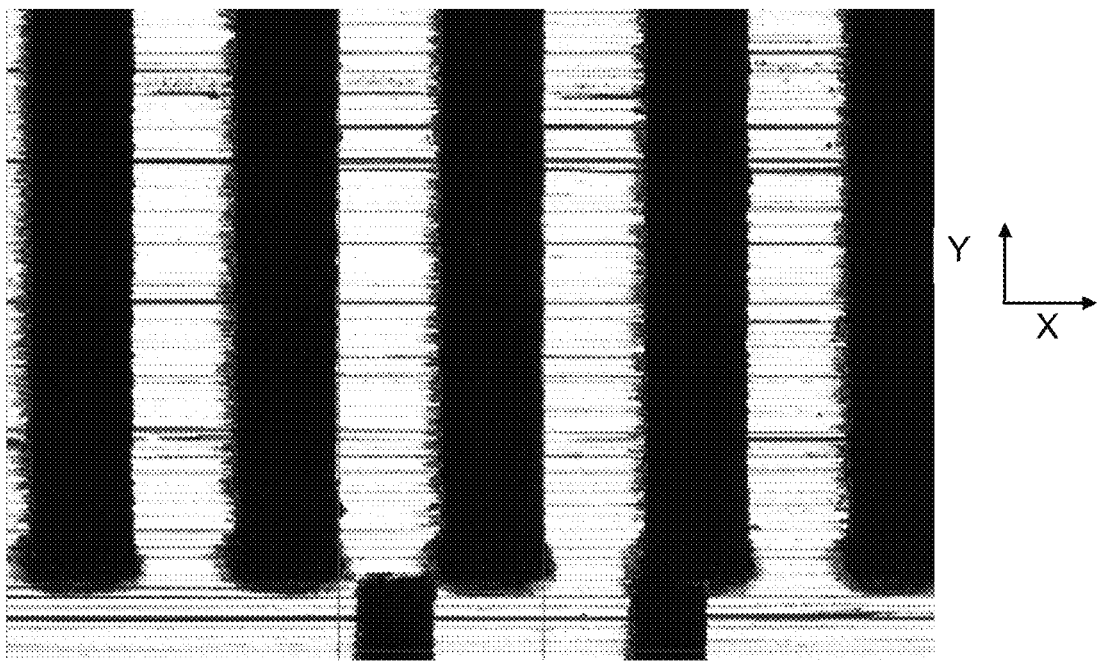
FIG. 6 schematically shows marking regions introduced in the side surface of a guide carriage of a profile rail guide by means of the method according to the invention prior to a surface cleaning.

FIG. 6 shows a top view through a microscope onto a measurement scale 15 as in FIG. 5, which is applied to a side surface of a guide carriage by means of the method according to the invention with the help of the above-mentioned short-pulse laser, but with a lager magnification, so that the outer contours of the respective marking regions and of the respective mirror regions of the measurement scale 15 can be seen more clearly. A total of five of the marking regions of the first track SP1 (incremental track) of the measurement scale 15 can be seen in FIG. 6 in an upper region of FIG. 6, and a total of two of the marking regions of the second track SP2 (reference track) of the measurement scale 15 can be seen on the lower edge of FIG. 6. Upon detailed observation of the marking regions, which are applied by means of the short-pulse laser, it can be seen that due to the impact of the light pulse generated by the short-pulse laser, material residues are created (in the form of small particles adhering to the surface), which can protrude into the respective adjacent (polished) mirror regions on the outer edges of the marking regions. This has the result that the respective marking regions do not appear to be limited cleanly in a straight line on their edges in the view according to FIG. 6. The latter can relate, for example, to edges of the marking regions, which, in the illustration according to FIG. 6, in each case extend transverse to the longitudinal direction of the measurement scale 15 (i.e. in the direction of the Y axis of a coordinate system specified in FIG. 6), and thus have an impact on the measuring accuracy of a linear encoder, which is based on an optical scanning of the measurement scale 15 in the longitudinal direction of the measurement scale 15.

Material residues of the above-mentioned type, which can be created during the application of the marking regions by means of a short-pulse laser of the above-mentioned type, can be removed completely by means of a surface cleaning process with a suitable cleaning agent.

It is furthermore important to point out that an irradiation of a surface of a guide carriage consisting of the material steel or stainless steel, respectively, by means of the light pulses of the short-pulse laser can have the effect that a chromium depletion (i.e. a reduction of the concentration of the portions of chromium contained in the steel) can be induced at the surface in the respective irradiated region. A chromium depletion of this type can reduce the corrosion resistance of the surface of the guide carriage (in particular in the marking regions of the measurement scale) and would thus be disadvantageous with respect to a desirable resistance of the measurement scale, which is as long-term as possible. In order to counteract the above-mentioned effect, a passivation of the side surface can preferably be performed by means of a suitable passivation agent after the application of the measurement scale to the side surface of the guide carriage.

For example, a highly alkaline cleaner, which is known under the name "deconex MT 19", which is produced and sold by the company Borer Chemie AG, Gewerbestrasse 13, 4528 Zuchwil, is suitable for the above-mentioned purpose as a cleaning agent for cleaning stainless steel surfaces.

For example, a highly acidic cleaner, which is known under the name "deconex MT 41", which is likewise produced and sold by the above-mentioned company Borer Chemie AG, is suitable for the above-mentioned purpose as a passivation agent for passivating stainless steel surfaces.

In particular the following sequential cleaning process has turned out to be suitable for cleaning and passivating the side surface of the guide carriage after the application of the measurement scale 15 to the side surface with the help of a short-pulse laser of the above-mentioned type:

1. cleaning using "deconex MT 19", 2% concentration at 55° C. and 25 kHz; 15 W/L;
2. passivating using "deconex MT 41", 8% concentration at 55° C. and 40 kHz; 15 W/L;
3. rinsing with DI water at room temperature and 40 kHz; 15 W/L; and
4. drying at 100° C.

Figure 7:
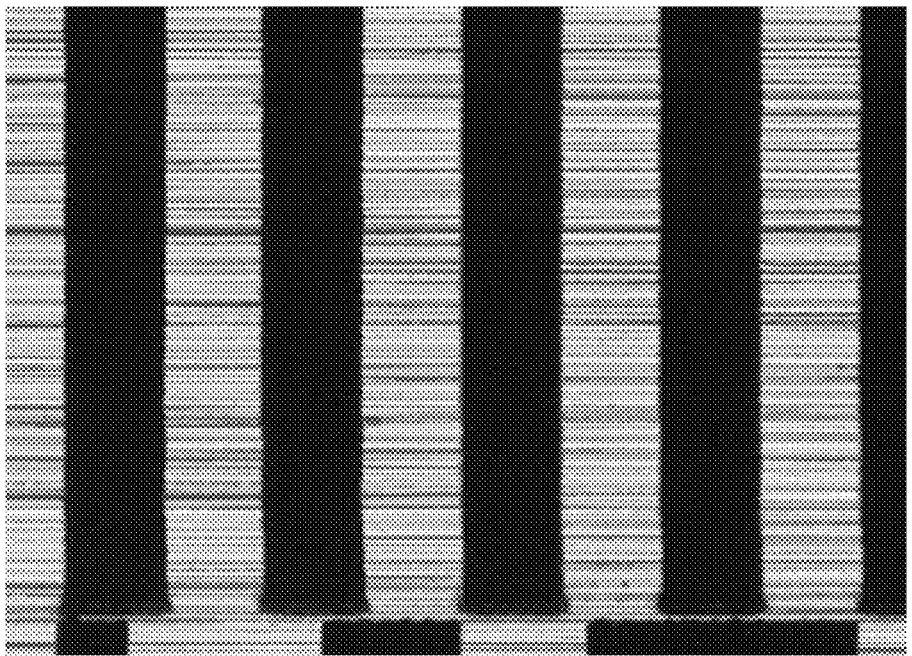
FIG. 7 schematically shows the marking regions according to FIG. 6 after performance of a surface cleaning.

FIG. 7 shows a view of the measurement scale according to FIG. 6 after performance of the above-listed ultrasonic cleaning process. Compared to FIG. 6, it can be seen clearly that the marking regions are essentially limited in a straight line after performance of the above-mentioned cleaning process. Material residues, which protrude into the respective adjoining mirror regions, can no longer be seen on the outer edges of the marking regions.

Figure 8:
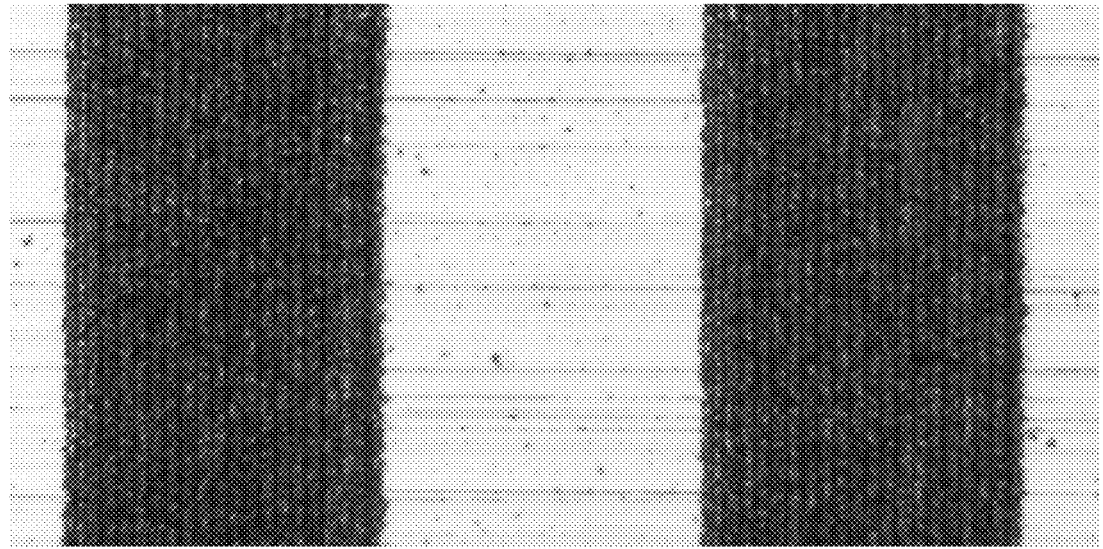
FIG. 8 shows a section from the illustration according to FIG. 5 for the magnified illustration of the surface of the guide rail in the region of a marking region with a magnification, which visualizes a roughening of the surface of the guide rail in the illustrated marking region.

FIG. 8 shows a section of the marking regions illustrated in FIG. 7 in a magnification, which shows structural details of the surface of the individual marking regions after performance of the above-listed ultrasonic cleaning process. In particular, a roughening of the surface, which is homogenous over the entire area of a marking region, can be seen.

As already mentioned, the roughness, which a side surface 2.1 of a guide carriage 2 has prior to the application of a measurement scale 15 to the side surface 2.1 according to the described method, decisively influences the intensity of the reflected light RL1 or RL2, respectively, which reflects in a linear encoder 11 according to FIG. 2 on the respective mirror regions of the first track SP1 or on the respective mirror regions of the second track SP2, respectively, of the measurement scale 15, which is applied to the side surface 2.1 according to the described method, and which is detected by means of the respective photo sensors of the first arrangement 25.1 of photo sensors or the respective photo sensors of the second arrangement 25.2 of photo sensors, respectively. The roughness, which the side surface 2.1 of the guide carriage 2 has prior to the application of a measurement scale 15 to the side surface 2.1 according to the described method, accordingly also decisively influences the size of the respective output signals, which the respective photo sensors of the first arrangement 25.1 of photosensors generate in each case during the detection of the light RL1 reflected on the first track SP1 of the measurement scale 15 or the respective photo sensors when detecting the light RL2 reflected on the second track SP2 of the measurement scale 15, respectively. The roughness, which the side surface 2.1 of the guide carriage 2 has prior to the application of a measurement scale 15 to the side surface 2.1 according to the described method, accordingly also decisively influences the amplitude of the variation, which the output signals of the respective photo sensors of the first arrangement 25.1 or the output signals of the respective photo sensors of the second arrangement 25.2, respectively, show in response to a movement of the guide carriage 2 in the longitudinal direction of the guide rail 3 as a function of the respective position of the measuring head 21 with respect to the longitudinal direction of the measurement scale 15.

In order to experimentally evaluate the above-mentioned influence of the roughness, which a side surface 2.1 of a guide carriage 2 has prior to the application of a measurement scale 15 to the side surface 2.1 according to the described method, a measurement scale 15 illustrated in FIG. 2 was in each case applied to side surfaces 2.1 of several different guide carriages 2 according to the described method, whereby a side surface 2.1 of one of the guide carriages was ground according to standard prior to the application of the measurement scale 15, but was not polished (after the grinding according to standard), and a side surface 2.1 of other guide carriages 2 was initially ground according to standard and subsequently polished additionally (after the grinding according to standard), in particular by means of a pre-polishing by means of a ceramic grinding disk with a very fine grain size (400 or finer) and subsequent polishing by means of a polishing disk bound on the basis of rubber or synthetic resin, or alternatively by means of polishing by means of polishing brushes.

The measurement scale 15 was thereby in each case applied to the side surface 2.1 of the respective guide carriage 2 by means of the same short-pulse laser, which served for the realization of the measurement scale 15 illustrated in FIGS. 5-8 (when using the same operating parameters of the short-pulse laser).

The laser beam accordingly had a circular profile and was applied to the side surface 2.1 of the respective guide carriage 2 in such a way that an individual light pulse of the laser beam irradiated a subregion with a diameter D of approx. 8 μm on the side surface 2.1 of the respective guide carriage. The marking regions of the respective measurement scale 15 were provided according to the example illustrated in FIG. 4B, whereby the parameters D and $\Delta X$ were selected as follows: D=8 μm and $\Delta X$=5 μm. The first track SP1 of the respective measurement scale 15 was thereby in each case realized in such a way that the individual marking regions M and the individual mirror regions S of the measurement scale 15 in each case have an extension of approx. 100 μm in the longitudinal direction of the measurement scale 15.

Each individual one of the measurement scales 15, which are provided in this way on side surfaces 2.1 of different guide carriages, was subsequently combined with a sensor device 20 illustrated in FIG. 2, in order to form a distance measuring system 10 illustrated in FIG. 2.

To characterize each individual one of the measurement scales 15, which are provided in this way on side surfaces 2.1 of different guide carriages 2, each individual one of these measurement scales 15 was optically scanned by means of the sensor device 20, wherein the sensor device 20 (as described in connection with FIG. 2) was in each case moved relative to the respective measurement scale 15 in the longitudinal direction of the respective measurement scale 15, the respective measurement scale 15 was illuminated thereby by means of a light beam 22.1 emitted by the light source 22, and the light RL1 reflected on the respective mirror regions of the first track SP1 was detected with the help of the photo sensors of the first arrangement 25.1 of photo sensors of the electronic light sensor chip 25.

The first arrangement 25.1 of photo sensors was thereby formed in such a way that the photo sensors of the first arrangement 25.1 of photo sensors in each case generate an output signal, which varies periodically between a maximum signal value Smax and a minimum signal value Smin as a function of the position of the sensor device 20 with respect to the longitudinal direction of the measurement scale 15, in response to a movement of the sensor device 20 in the longitudinal direction of the respective measurement scale 15, with a periodic variation, which corresponds to the course of a mathematical sine function or cosine function, respectively. In order to characterize this periodic variation of the respective output signal of one of the photo sensors of the first arrangement 25.1 of photo sensors, it is expedient to determine a "signal contrast" K of the respective output signal of one of the photo sensors of the first arrangement 25.1 of photo sensors, which, in this connection, can be defined as the ratio from the "amplitude" (Smax−Smin)/2 of the variation of the respective output signal as a function of the position of the sensor device 20 with respect to the longitudinal direction of the measurement scale 15 and the difference between an "average value" (i.e. (Smax+Smin)/2) of the respective output signal and a "base output signal" 50 of the respective photo sensor, i.e. the output signal of the respective photo sensor measured under the condition that the light source 22 is turned off and thus does not generate a light beam for illuminating the measurement scale 15, i.e. the signal contrast K of the respective output signal of one of the photo sensors of the first arrangement 25.1 is calculated as $$K=(Smax-Smin)/(Smax+Smin-2*S0).$$

The signal contrast K generally assumes a value between 0 and 1.

The roughness, which a side surface 2.1 of a guide carriage 2 has prior to the application of a measurement scale 15 to the side surface 2.1 according to the described method, has a significantly measurable influence on the size of the above-mentioned "signal contrast" K of the respective output signal of one of the photo sensors of the first arrangement 25.1 of photo sensors of the sensor device 20.

In the case of the measurement scale 15, which was applied to a side surface 2.1 of the guide carriage 2 according to the described method, which was ground only according to standard prior to the application of the measurement scale 15, but which (after the grinding according to standard) was not polished, the respective output signals of the photo sensors of the first arrangement 25.1 of photo sensors of the sensor device 20 showed a signal contrast K=0.29 when optically scanning the first track SP1 of the measurement scale 15.

In the case of the measurement scales 15, which were applied to a side surface 2.1 of guide carriages 2 according to the described method and which were initially ground according to standard prior to the application of the respective measurement scale 15 and were additionally polished subsequently (after the grinding according to standard), the respective output signals of the photo sensors of the first arrangement 25.1 of photo sensors of the sensor device 20 in each case showed a signal contrast K in the range of 0.5 to 0.65 (as a function of the respectively used method for polishing the side surface 2.1 of the respective guide carriages 2 and accordingly of the size of the reduction, which is in each case attained by means of the polishing, of the roughness of the respective side surface 2.1, to which the respective measurement scale 15 was applied according to the described method), in response to the optical scanning of the first track SP1 of the respective measurement scale 15.

By means of a polishing of the side surface 2.1 prior to the application of the respective measurement scale 15, the signal contrast K of the output signals of the photo sensors of the first arrangement 25.1 of photo sensors of the sensor device 20 can accordingly be increased significantly in response to the optical scanning of the first track SP1 of the respective measurement scale 15. The respective size of the above-mentioned signal contrast K is relevant for the measuring accuracy of the distance measuring system 10 illustrated in FIG. 2 or of the linear encoder 11 illustrated in FIG. 2, respectively: The larger the signal contrast K, the larger the accuracy, with which the respective position of the sensor device 20 can be determined with respect to the longitudinal direction of the respective measurement scale 15 by means of an evaluation of the output signals of the photo sensors of the first arrangement 25.1 of photo sensors of the sensor device 20.

As mentioned, it is in each case provided in the above-mentioned embodiments of the measurement scale 15 to provide the individual marking regions of the measurement scale 15 on a side surface 2.1 in such a way that all subregions of the respective marking region M, which are irradiated by means of an individual light pulse, in each case have overlaps UX and UY in two dimensions (i.e. in the longitudinal direction of the at least one track as well as transverse to the longitudinal direction of the at least one track). The respective overlaps UX and UY between the different irradiated subregions have an impact on the reflectivity of the respective marking regions M compared to the reflectivity of the individual mirror regions S. The reflectivity of the respective marking regions M can in particular be minimized by means of a suitable selection of the size of the respective overlaps UX and UY, which provides for an increase of the respective signal contrast K of the output signals of the photo sensors of the first arrangement 25.1 of photo sensors of the sensor device 20 during the optical scanning of the first track SP1 of the respective measurement scale 15.

In order to characterize the impact of the size of the respective overlaps of the different irradiated subregions of a marking region M, the impact of the size of the overlap UX on reflectivity of the respective marking regions M was evaluated in an exemplary manner.

For this purpose, three examples (hereinafter "example 1", "example 2", and "example 3") were produced on a side surface 2.1 by means of the method according to the invention, in each case next to one another, for a first track SP1 of the measurement scale 15 of the type illustrated in FIG. 3, wherein the side surface 2.1 was polished evenly prior to the provision of the marking regions M of the different first tracks SP1 in the entire region of the side surface.

The laser beam thereby had a circular profile and was applied to the side surface 2.1 in such a way that an individual light pulse of the laser beam irradiated a subregion on the side surface 2.1. The marking regions of the respective measurement scale 15 were provided according to the example illustrated in FIG. 4B, wherein the parameters D and $\Delta Y$ were selected as follows: D=15.2 μm and $\Delta Y$=5 μm. The first track SP1 of the respective measurement scale 15 was thereby in each case realized in such a way that the individual marking regions M and the individual mirror regions S of the measurement scale 15 in each case have an extension of approx. 100 μm in the longitudinal direction of the measurement scale 15.

The above-mentioned embodiments of the first track SP1 according to example 1, example 2, or example 3, respectively, are accordingly identical with regard to the distance $\Delta Y$, which decisively determines the extension DUY of the overlap UY of the subregions, which are irradiated by means of a laser pulse, in each case transverse to the direction of the X axis or transverse to the longitudinal direction of the first track SP1, respectively (DUY=D–$\Delta Y$=10.2 μm in the present case).

The above-mentioned embodiments of the first track SP1 according to example 1, example 2, or example 3, respectively, differ with regard to the distance $\Delta X$, which decisively determines the extension DUX of the overlap UX in the direction of the X axis or in the longitudinal direction of the first track SP1, respectively. $\Delta X$ were thereby selected as follows: $\Delta X$=5 μm for example 1; $\Delta X$=8 μm for example 2, or $\Delta X$=15.2 μm for example 3, respectively.

The above-mentioned embodiments of the first track SP1 according to example 1, example 2, or example 3, respectively, were in each case scanned by means of the above-described sensor device 20, and the respective output signals of the photo sensors of the first arrangement 25.1 of photo sensors of the sensor device 20 were measured for each of these embodiments during the optical scanning of the first track SP1 of the measurement scale 15. The signal contrast K of the respective output signal of one of the photo sensors of the first arrangement 25.1 of photo sensors of the sensor device 20 was thereby determined in each case for each of the mentioned embodiments of the first track SP1 according to example 1, example 2, or example 3, respectively.

The respective determined values for the signal contrast K, the distance $\Delta X$, and the extension DUX of the overlap UX in the direction of the X axis or in the longitudinal direction of the first track SP1, respectively, are specified in the following Table 1 for the above-mentioned embodiments of the first track SP1 according to example 1, example 2, or example 3, respectively.

TABLE 1

|  | D [μm] | $\Delta X$ [μm] | DUX [μm] | K (%) |
|---|---|---|---|---|
| Example 1 | 15.2 | 5 | 10.2 | 61.4 |
| Example 2 | 15.2 | 8 | 7.2 | 53.6 |
| Example 3 | 15.2 | 15.2 | 0 | 51.6 |

As can be seen from Table 1, the different subregions, which are irradiated by means of a laser pulse, in the case of example 3, are distributed in a marking region M in such a way that the different subregions do not have an overlap UX in the longitudinal direction of the first track SP1 (i.e. DUX=0). In the case of example 1 and of example 2, in contrast, an overlap UX with DUX>0 is present in each case.

As can be seen from Table 1, the signal contrast K for examples 1 and 2 is in each case larger than the corresponding value for the signal contrast K for example 3. Compared to example 3 (with DUX=0), an enlargement of the extension DUX of the overlap UX in the longitudinal direction of the first track SP1 accordingly leads to an increase of the signal contrast K and thus to a reduction of the reflectivity of a marking region M.

It is important to point out that it is also conceivable as alternative for the above-mentioned short-pulse laser to use an ultra short-pulse laser with a pulse duration in the picosecond range, for example with a pulse duration of less than 10 picoseconds, in order to apply a measurement scale to a surface of a guide rail in accordance with the invention.

The use of an ultra short-pulse laser of this type provides for an application of the measurement scale with a reduced thermal stress of the surface regions irradiated by means of laser pulses. This results in the advantage that after the application of the measurement scale, a performance of the above-described method for cleaning and passivation can be forgone.

Although only a few embodiments of the present invention have been shown and described, it is to be understood that many changes and modifications may be made thereunto without departing from the spirit and scope of the invention.

What is claimed is:

1. A method for applying a measurement scale (15) to a metal surface of a guide carriage (2) of a linear profile rail guide (1), wherein the guide carriage (2) is configured to be guided on a guide rail (3) of the profile rail guide (1), so that the guide carriage (2) is configured to be linearly movable in the longitudinal direction (X) of the guide rail (3), and wherein the guide carriage (2) has a first side surface (2.1), which is made of metal and extends in the longitudinal direction (X) of the guide rail (3), wherein the measurement scale (15) comprises at least one track (SP1, SP2), which extends linearly in the longitudinal direction (X) of the guide rail (3) and comprises several mirror regions (S; S1, S2, S3, S4, S5, S6, S7, S8, S9, S10, S11, S12, S13, S14, S15) and marking regions (M; M1, M2, M3, M4, M5, M6, M7, M8, M9, M10, M11, M12, M13, M14) arranged one behind another in an alternating manner, wherein each of the marking regions extends in a line-like manner transverse to the longitudinal direction (X) of the at least one track (SP1, SP2), and wherein the method has the following method steps:

providing a pulsed laser for generating a laser beam; and providing at least one of the marking regions (M; M1, M2, M3, M4, M5, M6, M7, M8, M9, M10, M11, M12, M13, M14) by introducing a microstructure in a first region (B1), which corresponds to the at least one marking region, of the first side surface (2.1) of the guide carriage (2), in that:

the laser generates the laser beam with a sequence of several light pulses, and the laser beam is directed at the first region (B1, B2) of the first side surface (2.1) in such a way that only a subregion (TB11, TB15, TB16, TB1n, TB21, TB25, TB26, TB2n) of the first region (B1) is irradiated by means of each individual light pulse of the generated sequence of several light pulses in such a way that the first side surface (2.1) in the subregion (TB11, TB15, TB16, TB1n, TB21, TB25, TB26, TB2n) of the first region (B1), which is irradiated by means of the respective individual light pulse, is changed due to the irradiation by means of the respective individual light pulse in such a way that after the irradiation by means of the respective individual light pulse, the first side surface (2.1) has a spatial modulation of the first side surface (2.1), which extends over the subregion (TB11, TB15, TB16, TB1n, TB21, TB25, TB26, TB2n) of the first region (B1), which is irradiated by means of the respective individual light pulse, wherein the spatial extension (D) of the subregion of the first region (B1), which is irradiated by means of the respective individual light pulse, in the longitudinal direction (X) of the at least one track is smaller than the spatial extension (DBX) of the first region (B1) in the longitudinal direction (X) of the at least one track (SP1, SP2), and the spatial extension (D) of the subregion irradiated by means of the respective individual light pulse transverse to the longitudinal direction (X) of the at least one track (SP1, SP2) is smaller than the spatial extension (DBY) of the first region (B1) transverse to the longitudinal direction (X) of the at least one track (SP1, SP2);

the laser beam is moved relative to the guide carriage (2), so that at least several of the light pulses of the generated sequence of several light pulses irradiate several different subregions (TB11, TB15, TB16, TB1n, TB21, TB25, TB26, TB2n) of the first region, which are arranged spatially distributed to one another, sequentially in time, wherein for each individual one of the several different irradiated subregions (TB15), at least two other ones of the several different irradiated subregions (TB16, TB25) are present, which are offset to the respective individual one of the several different irradiated subregions (TB15) in such a way that one of the at least two other ones of the several different irradiated subregions (TB25) is offset relative to the respective individual one of the several different irradiated subregions (TB15) in the longitudinal direction (X) of the at least one track (SP1, SP2) so that the one of the at least two other ones of the several different irradiated subregions (TB25) and the respective individual one of the several different irradiated subregions (TB15) have an overlap (UX), and that the other one of the at least two other ones of the several different irradiated subregions (TB16) is offset relative to the respective individual one of the several different irradiated subregions (TB15) TB15) transverse to the longitudinal direction (X) of the at least one track (SP1, SP2) so that the other one of the at least two other ones of the several different irradiated subregions (TB16) and the respective individual one of the several different irradiated subregions (TB15) have an overlap (UY), and wherein the several different irradiated subregions together form a region of the first side surface, which is congruent with the first region (B1).

2. The method according to claim 1, wherein the method further has the following method steps:

prior to the introduction of the microstructure into the first side surface (2.1) of the guide carriage (2) by means of the pulsed laser beam, at least the first side surface is subjected to a surface treatment in such a way that little material is in particular removed from the first side surface of the guide carriage; and after the introduction of the microstructure into the first side surface (2.1) of the guide carriage (2) by means of the laser beam, at least the first side surface of the guide carriage (2) is subjected to a surface cleaning.

3. The method according to claim 1, wherein the overlap (UX) between the respective individual one of the several different irradiated subregions (TB11, TB1*n*) and the at least one other one of the several different irradiated subregions (TB21, TB2*n*) in the longitudinal direction (X) of the at least one track (SP1, SP2) has a spatial extension (DUX), which is 20-50% of the spatial extension (D) of the subregion of the first region, which is irradiated by means of the respective individual light pulse, in the longitudinal direction (X) of the at least one track (SP1, SP2), and/or wherein the overlap (UY) between the respective individual one of the several different irradiated subregions (TB15) and the at least one other one of the several different irradiated subregions (TB16) transverse to the longitudinal direction (X) of the at least one track (SP1, SP2) has a spatial extension (DUY), which is 20-50% of the spatial extension (D) of the subregion of the first region, which is irradiated by means of the respective individual light pulse, transverse to the longitudinal direction (X) of the at least one track (SP1, SP2).

4. The method according to claim 1, wherein the laser is formed as short-pulse laser for generating pulsed laser light by means of light pulses with pulse durations of less than 15 nanoseconds or as ultra short-pulse laser for generating pulsed laser light by means of light pulses with pulse durations of less than 20 picoseconds; and/or wherein the pulse parameters of the laser and/or a laser focus are/is selected in such a way that a material roughening in the nanometer range is formed when introducing the microstructure into the first side surface (2.1) without material removal or at least without significant material removal along the surface paths.

5. The method according to claim 1, wherein prior to the introduction of the microstructure into the first side surface (2.1) of the guide carriage (2) by means of the pulsed laser beam, at least the first side surface (2.1) is subjected to the surface treatment by means of polishing; and/or wherein prior to the introduction of the microstructure into the first side surface (2.1) of the guide carriage (2) by means of the pulsed laser beam, at least the first side surface (2.1) is subjected to the surface treatment in such a way that the first side surface (2.1) has an average roughness value (Ra) of maximally 0.3 μm, preferably an average roughness value (Ra) of maximally 0.1 μm, and even more preferably an average roughness value (Ra) in a range of approximately 0.007 μm to 0.1 μm.

6. The method according to claim 1, wherein prior to the introduction of the microstructure into the first side surface (2.1) of the guide carriage (2) by means of the pulsed laser beam, at least the first side surface (2.1) is subjected to the surface treatment by means of polishing disks, by means of laser polishing and/or by means of electropolishing.

7. The method according to claim 1, wherein after the introduction of the microstructure into the first side surface (2.1) of the guide carriage (2), the first side surface (2.1) has, in one of the marking regions (M; M1, M2, M3, M4, M5, M6, M7, M8, M9, M10, M11, M12, M13, M14) of the measurement scale (15), an average roughness value (Ra), which is greater by more than a factor of 10 than the average roughness value of the side surface (2.1) in one of the mirror regions (S; S1, S2, S3, S4, S5, S6, S7, S8, S9, S10, S11, S12, S13, S14, S15) of the measurement scale (15).

8. The method according to claim 1, wherein after the introduction of the microstructure into the first side surface (2.1) of the guide carriage (2) by means of the laser beam, the first side surface (2.1) is subjected to a surface cleaning, wherein the surface cleaning is a laser treatment and/or a vibration cleaning or an application of the first side surface with ultrasound.

9. The method according to claim 1, wherein the laser beam has an essentially round beam bundle and is selected in such a way that the beam bundle on the first side surface (2.1) of the guide carriage (2) has a diameter of 3.5 μm bis 12 μm, preferably 6 μm to 9 μm, and in particular approximately 8 μm; and/or wherein the laser is operated with a pulse frequency of approximately 60 kHz.

10. A measurement scale (15) for a linear encoder (11), which linear encoder (11) comprises a guide carriage (2) of a linear profile rail guide (1), wherein the guide carriage (2) is configured to be guided on a guide rail (3) of the profile rail guide (1), so that the guide carriage (2) is configured to be linearly movable in the longitudinal direction (X) of the guide rail (3), and wherein the guide carriage (2) has a first side surface (2.1), which is made of metal and extends in the longitudinal direction (X) of the guide rail (3), wherein the measurement scale (15) comprises at least one track (SP1, SP2), which extends linearly in the longitudinal direction (X) of the guide rail (3) and comprises several mirror regions (S; S1, S2, S3, S4, S5, S6, S7, S8, S9, S10, S11, S12, S13, S14, S15) and marking regions (M; M1, M2, M3, M4, M5, M6, M7, M8, M9, M10, M11, M12, M13, M14) arranged one behind another in an alternating manner, wherein each of the marking regions (M; M1, M2, M3, M4, M5, M6, M7, M8, M9, M10, M11, M12, M13, M14) extends linearly transverse to the longitudinal direction (X) of the at least one track (SP1, SP2) and is formed to absorb incident light and/or to reflect it diffusely, wherein the mirror regions (S; S1, S2, S3, S4, S5, S6, S7, S8, S9, S10, S11, S12, S13, S14, S15), have an at least essentially smooth surface, which is formed to reflect incident light in a reflective manner, wherein the measurement scale (15) is applied to the first side surface (2.1) of the guide carriage (2) so that at least one of the marking regions (M; M1, M2, M3, M4, M5, M6, M7, M8, M9, M10, M11, M12, M13, M14) is provided as a microstructure being introduced in a first region (B1), which corresponds to the at least one marking region, of the first side surface (2.1) of the guide carriage (2), wherein the microstructure is configured to be introduced in the first region (B1) of the first side surface (2.1) by means of a sequence of several light pulses of a laser beam so that only a subregion (TB11, TB15, TB16, TB1*n*, TB21, TB25, TB26, TB2*n*) of the first region (B1) is enabled to be irradiated by means of each individual light pulse of the sequence of several light pulses in such a way that the first side surface (2.1) in the subregion (TB11, TB15, TB16, TB1*n*, TB21, TB25, TB26, TB2*n*) of the first region (B1), which is irradiated by means of the respective individual light pulse, is changed due to the irradiation by means of the respective individual light pulse in such a way that after the irradiation by means of the respective individual light pulse, the first side surface (2.1) has a spatial modulation extending over the subregion (TB11, TB15, TB16, TB1n, TB21, TB25, TB26, TB2n) of the first region (B1) irradiated by means of the respective individual light pulse, wherein the spatial extension (D) of the subregion of the first region (B1), which is irradiated by means of the respective individual light pulse, in the longitudinal direction (X) of the at least one track is smaller than the spatial extension (DBX) of the first region (B1) in the longitudinal direction (X) of the at least one track (SP1, SP2), and the spatial extension (D) of the subregion irradiated by means of the respective individual light pulse transverse to the longitudinal direction (X) of the at least one track (SP1, SP2) is smaller than the spatial extension (DBY) of the first region (B1) transverse to the longitudinal direction (X) of the at least one track (SP1, SP2);

wherein the microstructure is configured to be introduced in the first region (B1) of the first side surface (2.1) by means of the sequence of several light pulses so that several of the light pulses of the sequence of several light pulses are configured to irradiate sequentially in time several different subregions (TB11, TB15, TB16, TB1n, TB21, TB25, TB26, TB2n) of the first region, which are arranged spatially distributed to one another, wherein for each individual one of the several different irradiated subregions (TB15), at least two other ones of the several different irradiated subregions (TB16, TB25) are present, which are offset to the respective individual one of the several different irradiated subregions (TB15) in such a way that one of the at least two other ones of the several different irradiated subregions (TB25) is offset relative to the respective individual one of the several different irradiated subregions (TB15) in the longitudinal direction (X) of the at least one track (SP1, SP2) so that the one of the at least two other ones of the several different irradiated subregions (TB25) and the respective individual one of the several different irradiated subregions (TB15) have an overlap (UX), and that the other one of the at least two other ones of the several different irradiated subregions (TB16) is offset relative to the respective individual one of the several different irradiated subregions (TB15) transverse to the longitudinal direction (X) of the at least one track (SP1, SP2) so that the other one of the at least two other ones of the several different irradiated subregions (TB16) and the respective individual one of the several different irradiated subregions (TB15) have an overlap (UY), and wherein the several different irradiated subregions together form a region of the first side surface, which is congruent with the first region (B1).

11. The measurement scale (15) according to claim 10, wherein the at least one track (SP1) is formed as incremental track comprising a plurality of equidistantly arranged marking regions (M) or the at least one track (SP2) is formed as reference track with at least one marking region (M1, M2, M3, M4, M5, M6, M7, M8, M9, M10, M11, M12, M13, M14) for encoding at least one reference position.

12. A linear encoder (11), which has the following:

the measurement scale (15) according to claim 10; and at least one sensor device (20), which is formed to optically scan the at least one track (SP1, SP2) of the measurement scale (15), wherein the at least one sensor device (22) has a measuring head (21), which is arranged in a stationary manner with respect to the guide rail (3):

a light source (22) for emitting light (22.1) onto mirror regions (S; S1, S2, S3, S4, S5, S6, S7, S8, S9, S10, S11, S12, S13, S14, S15) and marking regions (M; M1, M2, M3, M4, M5, M6, M7, M8, M9, M10, M11, M12, M13, M14) of the measurement scale (15), and at least one arrangement of photo sensors (25.1, 25.2), which are formed to detect light (RL1, RL2) emitted by the light source (22) and reflected on mirror regions (S; S1, S2, S3, S4, S5, S6, S7, S8, S9, S10, S11, S12, S13, S14, S15) of the measurement scale (15).

* * * * *